United States Patent [19]

Mitsutani

[11] Patent Number: 5,737,916
[45] Date of Patent: Apr. 14, 1998

[54] CATALYST DETERIORATION DETECTION DEVICE FOR INTERNAL COMBUSTION ENGINE

[75] Inventor: Noritake Mitsutani, Toyota, Japan

[73] Assignee: Toyota Jidosha Kabushiki Kaisha, Toyota, Japan

[21] Appl. No.: 736,548

[22] Filed: Oct. 24, 1996

[30] Foreign Application Priority Data

Oct. 26, 1995 [JP] Japan ................... 7-279344
Oct. 30, 1995 [JP] Japan ................... 7-281803

[51] Int. Cl.$^6$ .......................... F01N 3/20; F02D 41/14
[52] U.S. Cl. .................................. 60/276; 60/277
[58] Field of Search ................... 60/274, 276, 277, 60/285; 73/118.1

[56] References Cited

U.S. PATENT DOCUMENTS

| | | | |
|---|---|---|---|
| 5,099,646 | 3/1992 | Nada | 60/274 |
| 5,165,230 | 11/1992 | Kayanuma et al. | 60/276 |
| 5,220,788 | 6/1993 | Kurita et al. | 60/274 |
| 5,267,472 | 12/1993 | Schneider et al. | 73/118.1 |
| 5,272,872 | 12/1993 | Grutter et al. | 60/274 |
| 5,279,115 | 1/1994 | Inoue et al. | 60/276 |
| 5,279,116 | 1/1994 | Shimizu et al. | 60/277 |
| 5,282,383 | 2/1994 | Kayanuma | 73/118.1 |
| 5,301,501 | 4/1994 | Shimizu et al. | 60/274 |
| 5,303,548 | 4/1994 | Shimizu et al. | 60/277 |
| 5,325,664 | 7/1994 | Seki et al. | 60/276 |
| 5,335,538 | 8/1994 | Blischke et al. | 73/118.1 |
| 5,337,555 | 8/1994 | Tokuda et al. | 60/276 |
| 5,351,484 | 10/1994 | Wade | 60/274 |
| 5,357,754 | 10/1994 | Ogawa et al. | 60/276 |
| 5,359,853 | 11/1994 | Shimizu | 60/276 |
| 5,377,484 | 1/1995 | Shimizu | 60/276 |
| 5,381,657 | 1/1995 | Takizawa et al. | 60/276 |
| 5,386,693 | 2/1995 | Orzel | 60/274 |
| 5,386,695 | 2/1995 | Iwata et al. | 60/276 |
| 5,412,941 | 5/1995 | Suzuki | 60/276 |
| 5,414,996 | 5/1995 | Sawada et al. | 60/277 |
| 5,417,058 | 5/1995 | Shimizu | 60/276 |
| 5,438,827 | 8/1995 | Ohuchi et al. | 60/277 X |
| 5,448,886 | 9/1995 | Toyoda | 60/277 X |
| 5,462,039 | 10/1995 | Mamiya et al. | 123/686 |
| 5,487,269 | 1/1996 | Atanasyan et al. | 60/274 |
| 5,622,047 | 4/1997 | Yamashita et al. | 60/274 |
| 5,636,514 | 6/1997 | Seki | 60/277 |

FOREIGN PATENT DOCUMENTS

| | | |
|---|---|---|
| A-63-97852 | 4/1988 | Japan . |
| A-4-303754 | 10/1992 | Japan . |
| A-5-10181 | 1/1993 | Japan . |
| A-5-18231 | 1/1993 | Japan . |
| A-6-159048 | 6/1994 | Japan . |

*Primary Examiner*—Tony M. Argenbright
*Attorney, Agent, or Firm*—Oliff & Berridge, PLC

[57] ABSTRACT

A catalyst deterioration detection device for an internal combustion engine, according to the present invention, includes a three-way catalyst mounted in an exhaust passage of the internal combustion engine and having an $O_2$ storage capability and an air-fuel ratio sensor, mounted upstream of the three-way catalyst, for linearly detecting an air-fuel ratio. An air-fuel ratio feedback control unit, based on the output of the air-fuel ratio sensor, calculates a feedback correction amount consisting of a proportional term for bringing the air-fuel ratio to stoichiometry and an integral term for bringing an integrated value of an error between the air-fuel ratio and stoichiometry to zero. An $O_2$ sensor, mounted downstream of the three-way catalyst, detects whether the air-fuel ratio is rich or lean. A catalyst deterioration determining unit determines deterioration of the three-way catalyst on the basis of the length of a response curve that the output of the $O_2$ sensor describes during the time that air-fuel ratio feedback control is being performed by the air-fuel ratio feedback control unit. A response curve length calculation interrupting unit interrupts the calculation of the response curve length being performed by the catalyst deterioration determining unit for a predetermined length of time when the output of the air-fuel ratio sensor or the amount of change of the output has exceeded a preset value.

5 Claims, 25 Drawing Sheets

Fig.5

| No. | VAF | VOS | |
| --- | --- | --- | --- |
| | | NORMAL CATALYST | DETERIORATED CATALYST |
| 1 | MINIMUM | MINIMUM, 1.0 | MINIMUM, 1.0 |
| 2 | SMALL | MINIMUM, 0.5 | MEDIUM, 2.0 |
| 3 | MEDIUM | SMALL, 0.2 | LARGE, 1.5 |
| 4 | LARGE | MEDIUM, 0.4 | LARGE, 1.0 |
| 5 | MAXIMUM | LARGE, 0.6 | LARGE, 0.6 |

Fig.11

|  | n TIMES BACK | ... | 2 TIMES BACK | PREVIOUS TIME | PRESENT TIME |
|---|---|---|---|---|---|
| ESTIMATED CYLINDER AIR AMOUNT | $MC_n$ | ... | $MC_2$ | $MC_1$ | $MC_0$ |
| TARGET CYLINDER FUEL AMOUNT | $FCR_n$ | ... | $FCR_2$ | $FCR_1$ | $FCR_0$ |

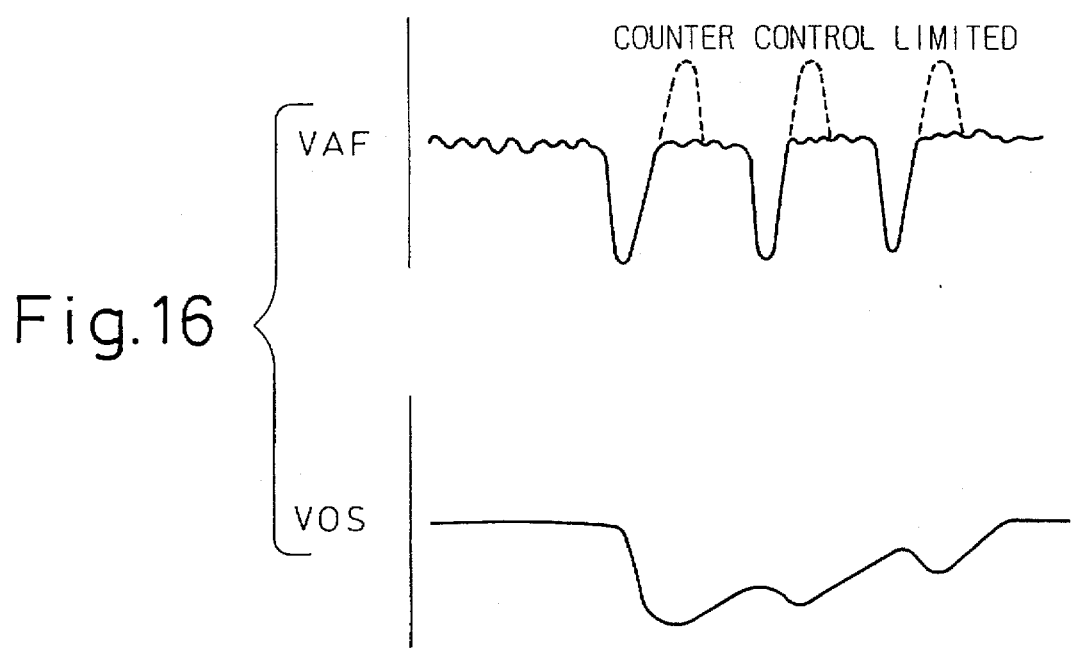

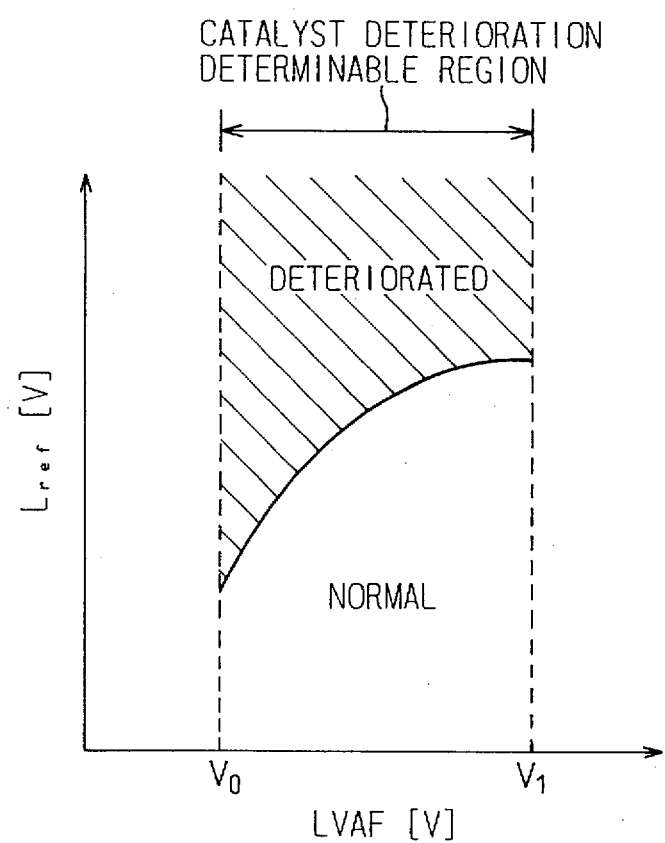

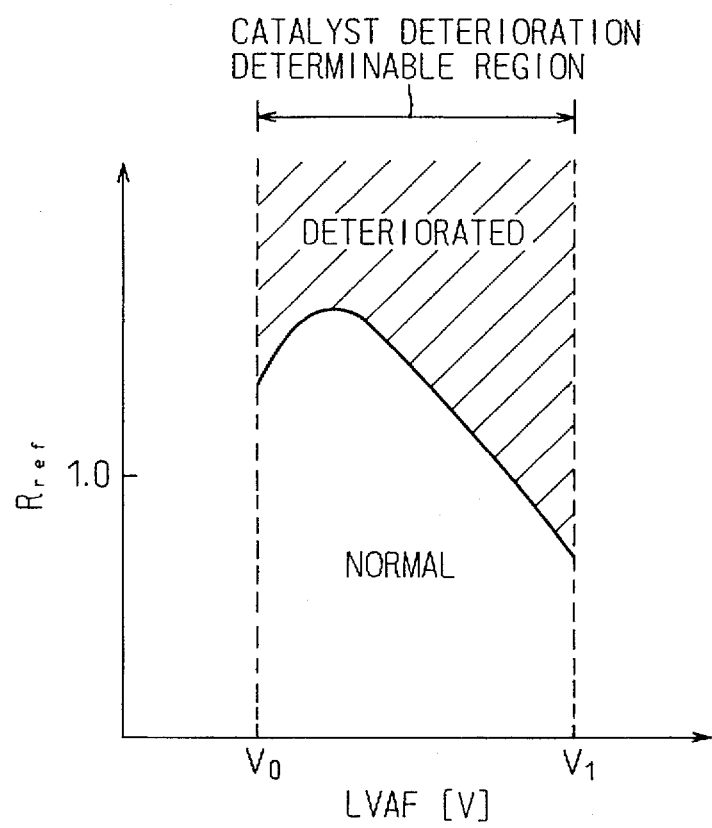

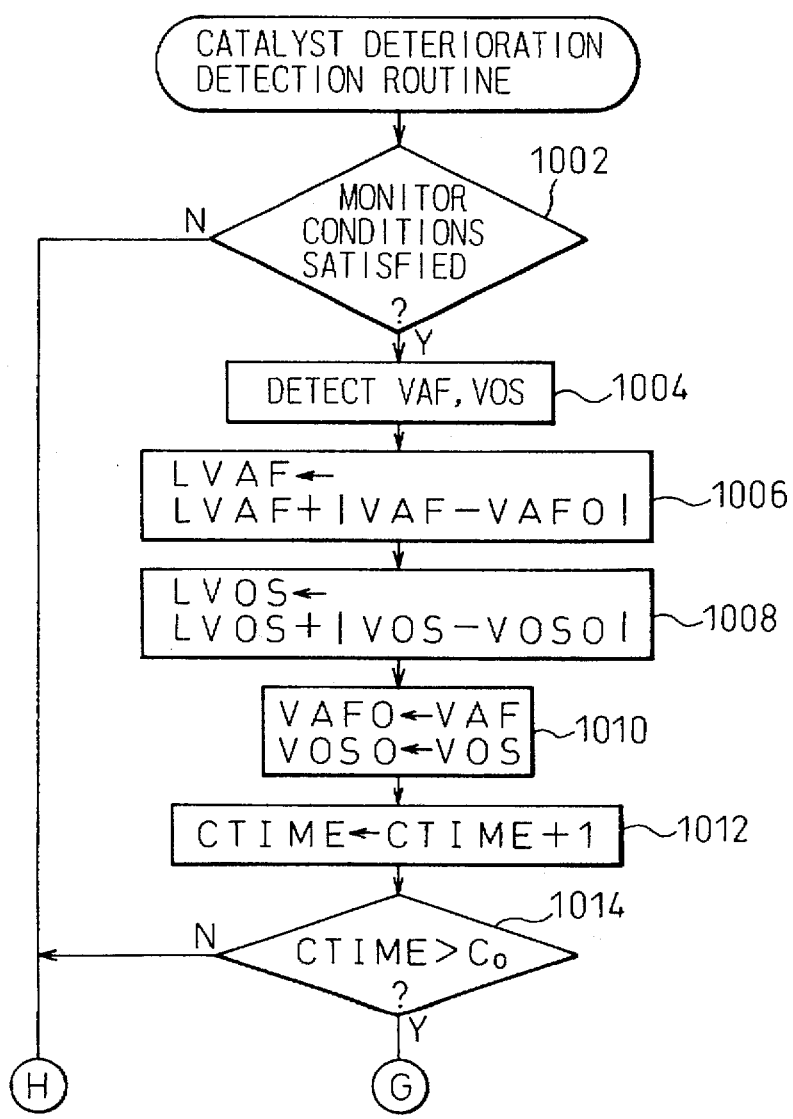

5,737,916

CATALYST DETERIORATION DETECTION DEVICE FOR INTERNAL COMBUSTION ENGINE

BACKGROUND OF THE INVENTION

1. Field of the Invention

The present invention relates to a device for detecting deterioration of a catalyst installed in an exhaust passage of an internal combustion engine for exhaust gas purification.

2. Description of the Related Art

Three-way catalysts for simultaneously promoting the oxidation of unburned constituents (HC and CO) and the reduction of nitrogen oxides ($NO_x$) in automotive exhaust have been used on automotive engines to control exhaust emissions. For a maximum oxidation/reduction efficiency of the three-way catalyst, the air-fuel ratio (A/F), a measure of engine combustion state, must be controlled within a very narrow range (called the window) and centered on stoichiometry. To achieve this, in fuel injection control in an engine, an $O_2$ sensor (oxygen concentration sensor—see FIG. 1) is mounted and detects whether the air-fuel ratio is on the lean side or rich side with respect to stoichiometry on the basis of the concentration of residual oxygen in the exhaust gas, and air-fuel ratio feedback control is performed to correct the quantity of fuel based on the sensor output.

In such air-fuel ratio feedback control, the $O_2$ sensor for detecting the oxygen concentration is mounted as close as possible to the combustion chamber, that is, on the upstream side of the catalytic converter. Furthermore, to compensate for variations in the output characteristic of the $O_2$ sensor, a double $O_2$ sensor system having a second $O_2$ sensor on the downstream side of the catalytic converter has also been introduced for commercial use. The principle of this system is based on the fact that, on the downstream side of the catalytic converter, the exhaust gas is thoroughly stirred, and its oxygen concentration is almost in equilibrium by the action of the three-way catalyst; consequently, the output of the downstream $O_2$ sensor changes only slightly compared with the upstream $O_2$ sensor, and thus indicates whether the air/fuel mixture as a whole is on the rich side or lean side. In the double $O_2$ sensor system, sub air-fuel ratio feedback control is performed using the $O_2$ sensor downstream of the catalyst in addition to the main air-fuel ratio feedback control by the $O_2$ sensor upstream of the catalyst, and the coefficient for air-fuel ratio correction by the main air-fuel ratio feedback control is corrected based on the output of the downstream $O_2$ sensor, to accommodate variations in the output characteristic of the upstream $O_2$ sensor and thereby improve the precision of air-fuel ratio control.

Even when such precise air-fuel ratio control is performed, if the catalyst deteriorates due to exposure to exhaust gas heat or is poisoning by lead and other contaminants, a sufficient exhaust gas purification performance cannot be obtained. To address this problem, a variety of catalyst deterioration detection devices have been proposed in the prior art. One such device diagnoses the deterioration of the catalyst by detecting a decrease in the $O_2$ storage effect (the function to store excessive oxygen and reuse it for the purification of unburned exhaust emissions) after warmup using an $O_2$ sensor mounted on the downstream side of the catalyst. That is, deterioration of the catalyst leads to a degradation in the purification performance, and the device deduces the degradation of the purification performance from a decrease in the $O_2$ storage effect; more specifically, by using an output signal from the downstream $O_2$ sensor, the device obtains response curve length, feedback frequency, etc. and detects the decrease of the $O_2$ storage effect and hence, the deterioration of the catalyst. In one specific example disclosed in Japanese Patent Unexamined Publication No. 5-98948 (corresponding U.S. Pat. No. 5,301,501), the length of the response curve of the output of the downstream $O_2$ sensor is obtained during feedback control toward stoichiometry, and by comparing its response curve length or the ratio of that length to the response curve length of the upstream $O_2$ sensor with a reference value, the deterioration of the catalyst is determined.

On the other hand, recent years have also seen the development of an internal combustion engine in which the air-fuel ratio is controlled so that the three-way catalyst can provide a constant and stable purification performance. That is, the $O_2$ storage capability is such that, when the exhaust gas is in a lean state, excessive oxygen is adsorbed, and when the exhaust gas is in a rich state, the necessary oxygen is released, thereby purifying the exhaust gas; however, such a capability is limited. To make effective use of the $O_2$ storage capability, therefore, it is important to maintain the amount of oxygen stored in the catalyst at a prescribed level (for example, one-half the maximum oxygen storage amount) so that the next change in the air-fuel ratio of the exhaust gas can be accommodated, whether it is a change to a rich state or a lean state. When the oxygen amount is maintained in this manner, a consistent $O_2$ adsorption/desorption function can be achieved, thus ensuring a consistent oxidation/reduction performance of the catalyst.

In the internal combustion engine in which the $O_2$ storage amount is controlled at a constant level to maintain the purification performance of the catalyst, an air-fuel ratio (A/F) sensor (see FIG. 2) capable of a linear detection of air-fuel ratio is used, and feedback control (F/B control) is performed based on proportional and integral operations (PI operations). That is, a feedback fuel correction amount is calculated by Next fuel correction amount=$K_p$*(Present fuel error)+ $K_s$*Σ(previous fuel errors)

where

Fuel error=(Fuel amount actually burned in cylinder)− (Target fuel amount in cylinder with intake air at stoichiometry)

Fuel amount actually burned in cylinder=Detected value of air amount/Detected value of air-fuel ratio $K_p$=Proportional gain $K_s$=Integral gain As can be seen from the above equation for the fuel correction amount, the proportional term is the component that acts to maintain the air-fuel ratio at stoichiometry, as in the feedback control using an $O_2$ sensor, while the integral term is the component that acts to eliminate the steady-state error (offset). That is, by the action of the integral term, the $O_2$ storage amount in the catalyst is maintained at a constant value. For example, as shown in FIG. 3, when enleanment occurs as a result of abrupt acceleration or the like, the air-fuel ratio is enriched by the action of the integral term, offsetting the effect of the enleanment. Control performed to intentionally vary the air-fuel ratio in this manner in order to maintain the $O_2$ storage amount at a constant level is called counter control.

In such an internal combustion engine equipped with an $O_2$ storage amount constant control system with an A/F sensor mounted on the upstream side of the catalyst, an $O_2$ sensor also may be mounted on the downstream side of the catalyst to compensate for variations in the output characteristic of the A/F sensor. In that case also, it will be possible to detect the deterioration of the catalyst by detecting a decrease in the $O_2$ storage effect of the catalyst by using the $O_2$ sensor, as in the double $O_2$ sensor system. For example, Japanese Patent Unexamined Publication No. 6-101455 (corresponding U.S. Pat. No. 5,357,754) discloses an internal combustion engine in which feedback control of the air-fuel ratio is performed based on the output of an A/F sensor mounted upstream of a three-way catalyst, and the deterioration of the catalyst is determined based on the average value and the variation amplitude of the output of an $O_2$ sensor mounted downstream of the catalyst.

However, when the above catalyst deterioration detection process is applied to the $O_2$ storage amount constant control system, the following problem will arise. First, in the $O_2$ storage amount constant control system, counter control is performed as needed, as described above. When the control is performed, the A/F sensor output voltage VAF, and hence the air-fuel ratio, varies widely, as shown in FIG. 4A (No emission perturbations occur since the air-fuel ratio of the gas actually entering the catalyst stays within the window). Furthermore, since the sub feedback control by the $O_2$ sensor is performed so that the $O_2$ sensor output is at or very near stoichiometry (see FIG. 1), the output voltage VOS of the $O_2$ sensor varies greatly with the variation of the air-fuel ratio. In addition, an excessive response occurs due to a sudden change in the gas exposure condition of the $O_2$ sensor. This can cause erroneous determination if the deterioration of the catalyst is determined based on the length of the response curve of the output of the $O_2$ sensor, etc.

The following problem will also arise. The amplitude of the swing of the downstream $O_2$ sensor depends on the variation of the air-fuel ratio of the gas exiting the catalyst, which in turn depends on the variation of the air-fuel ratio of the gas entering the catalyst. Accordingly, even when there is no change in the catalyst performance, if there occurs a change in the amplitude of the variation of the air-fuel ratio of the catalyst entering gas, the amplitude of the swing of the downstream $O_2$ sensor also changes. When determining the deterioration of the catalyst based on the output of the downstream $O_2$ sensor, therefore, erroneous determination may result due to changes in the variation amplitude of the air-fuel ratio of the catalyst entering gas. The reason for the occurrence of such erroneous determination will be explained below with reference to drawings.

FIG. 5 is a diagram showing how the output voltage VOS of the downstream $O_2$ sensor varies for normal catalyst and abnormal (deteriorated) catalyst conditions when the air-fuel ratio variation of the catalyst entering gas is "minimum", "small", "medium", "large", and "maximum", respectively, for convenience's sake (the variation is approximately equal to the output voltage VAF of the A/F sensor, mounted upstream of the catalyst, that linearly detects the air-fuel ratio). When the VAF variation, and hence the VAF curve length LVAF, is "minimum", the VOS variation amplitude, and hence the VOS curve length LVOS, is "minimum" regardless of whether the catalyst condition is normal or abnormal, and the response curve length ratio of LVOS to LVAF is 1.0.

Next, when LVAF is "small", if the catalyst is normal, LVOS remains "minimum" because of the $O_2$ storage effect, and the response curve length ratio is 0.5; on the other hand, if the catalyst is deteriorated, the $O_2$ storage effect does not work, and LVOS is "medium", resulting in a response curve length ratio of 2.0. When LVAF is "medium", if the catalyst is normal, LVOS is "small", and the response curve length ratio is 0.2; if the catalyst is deteriorated, LVOS reaches a limit value "large" (the limit of the so-called Z characteristic of the $O_2$ sensor—see FIG. 1), while the response curve length ratio decreases to 1.5. Next, when LVAF is "large", if the catalyst is normal, LVOS is "medium", and the response curve length ratio is 0.4; if the catalyst is deteriorated, LVOS remains "large", and the response curve length ratio further decreases to 1.0. Finally, when LVAF is "maximum", if the catalyst is normal, LVOS reaches the limit value "large", and the response curve length ratio is 0.6; if the catalyst is deteriorated, LVOS remains "large", and the response curve length ratio further decreases to 0.6.

The distributions of data for the response curve length LVOS and response curve length ratio LVOS/LVAF are respectively shown in FIGS. 6A and 6B. In these figures, numbers (1), (2), . . . , (5) for normal catalyst and [1], [2], . . . , [5] for deteriorated catalyst are plotted correspondingly to the numbers in FIG. 5. As can be seen from these figures, if the deterioration of the catalyst is to be determined by simply comparing the response curve length LVOS or the response curve length ratio LVOS/LVAF using the prior art technique, there is a region where the values overlap between the normal and deteriorated catalysts, and in that region, determination of the deterioration of the catalyst is impossible. In this way, even when there is no change in the catalyst performance, if the variation amplitude of the air-fuel ratio of the catalyst entering gas changes, the variation amplitude of the air-fuel ratio of the catalyst exiting gas, and hence the amplitude of the swing of the downstream $O_2$ sensor, changes; therefore, determining the deterioration of the catalyst based on the output of the downstream $O_2$ sensor involves a possibility of erroneous determination.

SUMMARY OF THE INVENTION

In view of the above situation, it is an object of the present invention to provide a catalyst deterioration detection device that can determine catalyst deterioration accurately on the basis of the output of an $O_2$ sensor mounted downstream of the catalyst while preventing erroneous determination due to counter control, for an internal combustion engine in which air-fuel ratio feedback control is performed based on the output of an A/F sensor mounted upstream of the catalyst.

It is another object of the present invention to provide a catalyst deterioration detection device that can determine catalyst deterioration accurately on the basis of the output of an $O_2$ sensor mounted downstream of the catalyst regardless of the variation amplitude of the air-fuel ratio of a mixture entering the catalyst, for an internal combustion engine in which air-fuel ratio feedback control is performed based on the output of an A/F sensor mounted upstream of the catalyst.

It is a further object of the present invention to improve exhaust gas purification performance and contribute to the prevention of air pollution by establishing a technique that can determine catalyst deterioration accurately by means of an $O_2$ sensor mounted downstream of the catalyst, for an internal combustion engine in which an $O_2$ storage amount constant control system using an A/F sensor is employed.

According to a first aspect of the invention, there is provided a catalyst deterioration detection device for an internal combustion engine, comprising: a three-way catalyst mounted in an exhaust passage of the internal combustion engine and having an $O_2$ storage capability; an air-fuel ratio sensor, mounted upstream of the three-way catalyst, for linearly detecting an air-fuel ratio; air-fuel ratio feedback control means for, based on the output of the air-fuel ratio sensor, calculating a feedback correction amount consisting of a proportional term for bringing the air-fuel ratio to stoichiometry and an integral term for bringing an integrated value of an error between the air-fuel ratio and stoichiometry to zero; an $O_2$ sensor, mounted downstream of the three-way catalyst, for detecting whether the air-fuel ratio is rich or lean; catalyst deterioration determining means for determining deterioration of the three-way catalyst on the basis of the length of a response curve that the output of the $O_2$ sensor describes during the time that air-fuel ratio feedback control is being performed by the air-fuel ratio feedback control means; and a response curve length calculation interrupting means for interrupting the calculation of the response curve length being performed by the catalyst deterioration determining means for a predetermined length of time when the output of the air-fuel ratio sensor or the amount of change of the output has exceeded a preset value.

According to a second aspect of the invention, there is provided a catalyst deterioration detection device for an internal combustion engine, comprising: a three-way catalyst mounted in an exhaust passage of the internal combustion engine and having an $O_2$ storage capability; an air-fuel ratio sensor, mounted upstream of the three-way catalyst, for linearly detecting an air-fuel ratio; air-fuel ratio feedback control means for, based on the output of the air-fuel ratio sensor, calculating a feedback correction amount consisting of a proportional term for bringing the air-fuel ratio to stoichiometry and an integral term for bringing an integrated value of an error between the air-fuel ratio and stoichiometry to zero; an $O_2$ sensor, mounted downstream of the three-way catalyst, for detecting whether the air-fuel ratio is rich or lean; catalyst deterioration determining means for determining deterioration of the three-way catalyst on the basis of the length of a response curve that the output of the $O_2$ sensor describes during the time that air-fuel ratio feedback control is being performed by the air-fuel ratio feedback control means; and integral term limiting means for imposing an upper limit on an absolute value of the integral term or on a gain of the integral term when processing for determination is being performed by the catalyst deterioration determining means.

According to a third aspect of the invention, there is provided a catalyst deterioration detection device for an internal combustion engine, comprising: a three-way catalyst mounted in an exhaust passage of the internal combustion engine and having an $O_2$ storage capability; an air-fuel ratio sensor, mounted upstream of the three-way catalyst, for linearly detecting an air-fuel ratio; first air-fuel ratio feedback control means for, based on the output of the air-fuel ratio sensor, calculating a feedback correction amount consisting of a proportional term for bringing the air-fuel ratio to stoichiometry and an integral term for bringing an integrated value of an error between the air-fuel ratio and stoichiometry to zero; an $O_2$ sensor, mounted downstream of the three-way catalyst, for detecting whether the air-fuel ratio is rich or lean; second air-fuel ratio feedback control means for correcting the output of the air-fuel ratio sensor on the basis of the output of the $O_2$ sensor; catalyst deterioration determining means for determining deterioration of the three-way catalyst on the basis of the length of a response curve that the output of the $O_2$ sensor describes during the time that air-fuel ratio feedback control is being performed by the first air-fuel ratio feedback control means; and air-fuel ratio sensor output correction inhibiting means for inhibiting the correction of the output of the air-fuel ratio sensor by the second air-fuel ratio feedback control means when processing for determination is being performed by the catalyst deterioration determining means.

According to a fourth aspect of the invention, there is provided a catalyst deterioration detection device for an internal combustion engine, comprising: a three-way catalyst mounted in an exhaust passage of the internal combustion engine and having an $O_2$ storage capability; an air-fuel ratio sensor, mounted upstream of the three-way catalyst, for linearly detecting air-fuel ratio; air-fuel ratio feedback control means for feedback controlling the air-fuel ratio toward stoichiometry on the basis of the output of the air-fuel ratio sensor; an $O_2$ sensor, mounted downstream of the three-way catalyst, for detecting whether the air-fuel ratio is rich or lean; catalyst deterioration determining means for determining deterioration of the three-way catalyst by comparing the length of a response curve that the output of the $O_2$ sensor describes or the ratio of the response curve length of the output of the $O_2$ sensor to that of the output of the air-fuel ratio sensor with a deterioration determination reference value during the time that air-fuel ratio feedback control is being performed by the air-fuel ratio feedback control means; and catalyst deterioration determination limiting means for imposing a limit so that the determination by the catalyst deterioration determining means is carried out only when the response curve length or variation amplitude of the output of the air-fuel ratio sensor is within a prescribed range.

According to a fifth aspect of the invention, there is provided a catalyst deterioration detection device for an internal combustion engine, comprising: a three-way catalyst mounted in an exhaust passage of the internal combustion engine and having an $O_2$ storage capability; an air-fuel ratio sensor, mounted upstream of the three-way catalyst, for linearly detecting an air-fuel ratio; air-fuel ratio feedback control means for feedback controlling the air-fuel ratio toward stoichiometry on the basis of the output of the air-fuel ratio sensor; an $O_2$ sensor, mounted downstream of the three-way catalyst, for detecting whether the air-fuel ratio is rich or lean; catalyst deterioration determining means for determining deterioration of the three-way catalyst by comparing the length of a response curve that the output of the $O_2$ sensor describes or the ratio of the response curve length of the output of the $O_2$ sensor to that of the output of the air-fuel ratio sensor with a deterioration determination reference value during the time that air-fuel ratio feedback control is being performed by the air-fuel ratio feedback control means; and reference value changing means for changing the deterioration determination reference value according to the response curve length or variation amplitude of the output of the air-fuel ratio sensor.

BRIEF DESCRIPTION OF THE DRAWINGS

Further features and advantages of the present invention will be apparent from the following description with reference to the accompanying drawings, in which:

FIG. 5 is a diagram showing how the output voltage VOS of the $O_2$ sensor mounted downstream of a catalyst varies for normal catalyst and abnormal catalyst conditions when the air-fuel ratio variation of catalyst entering gas (the output voltage VAF of the A/F sensor mounted upstream of the catalyst) is minimum, small, medium, large, and maximum, respectively;

FIG. 11 is a diagram for explaining how the estimated cylinder air amount and calculated target cylinder fuel amount are stored;

FIG. 16 is a diagram for explaining the principle of a second embodiment;

FIG. 21 is a diagram showing a map for obtaining from the response curve length LVAF of the A/F sensor output a reference value $L_{ref}$ for determining catalyst deterioration based on the response curve length LVOS of the $O_2$ sensor output;

FIG. 23 is a diagram showing a map for obtaining from the response curve length LVAF of the A/F sensor output a reference value $R_{ref}$ for determining catalyst deterioration based on the response curve length ratio LVOS/LVAF between the $O_2$ sensor and A/F sensor outputs; and FIGS. 24A and 24B show a flowchart illustrating a processing sequence for a catalyst deterioration detection routine according to the fifth embodiment.

DESCRIPTION OF THE PREFERRED EMBODIMENTS

The preferred embodiments of the present invention will be described below with reference to the accompanying drawings.

Figure 7:
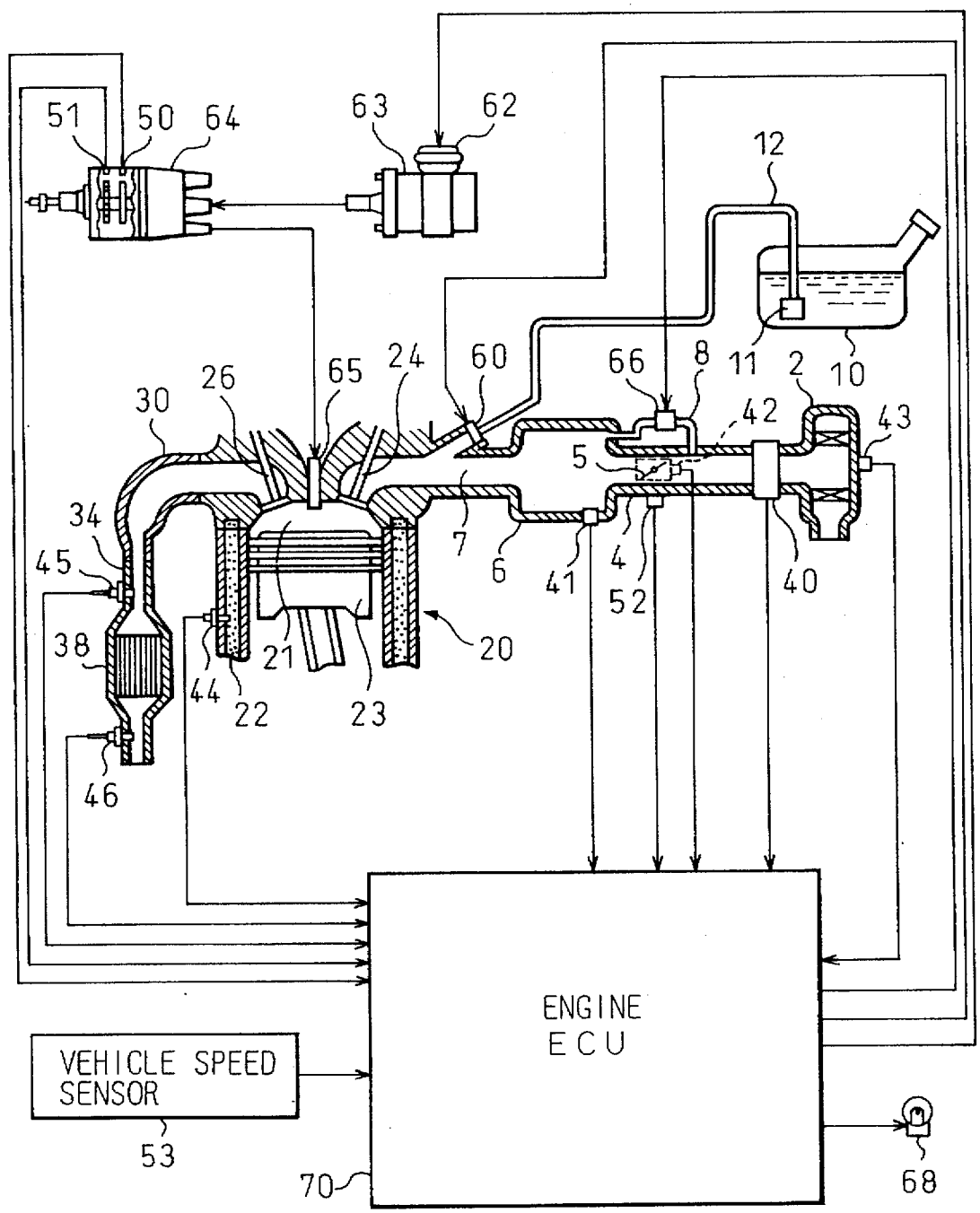
FIG. 7 is a schematic diagram showing the general construction of an electronically controlled internal combustion engine equipped with a catalyst deterioration detection device according to one embodiment of the present invention.

FIG. 7 is a schematic diagram showing the general construction of an electronically controlled internal combustion engine equipped with a catalyst deterioration detection device according to one embodiment of the present invention. Air necessary for combustion in the engine 20 is filtered through an air cleaner 2, and introduced through a throttle body 4 into a surge tank (intake manifold) 6 for distribution to an intake pipe 7 of each cylinder. Intake air flow rate is measured by an air flow meter 40, and is regulated by a throttle valve 5 provided in the throttle body 4. Intake air temperature is detected by an intake air temperature sensor 43. Further, intake manifold pressure is detected by a vacuum sensor 41.

The opening angle of the throttle valve 5 is detected by a throttle angle sensor 42. When the throttle valve 5 is in its fully closed position, an idle switch 52 is turned on, and its output as a throttle full-close signal is set active. An idle speed control valve (ISCV) 66 for adjusting the air flow rate during idling is installed in an idle adjust passage 8 that bypasses the throttle valve 5.

On the other hand, the fuel stored in a fuel tank 10 is drawn by a fuel pump 11, passes through a fuel pipe 12, and is injected into the intake pipe 7 through a fuel injector valve 60.

The air and fuel are mixed together in the intake pipe 7, and the mixture is drawn through an intake valve 24 into a combustion chamber 21 of a cylinder 20, that is, into the engine body. In the combustion chamber 21, the air/fuel mixture is first compressed by the piston 23, and then ignited and burned causing a rapid pressure rise and thus producing power. To accomplish the ignition, an ignition signal is applied to an igniter 62, which controls the supply and cutoff of a primary current to an ignition coil 63, and the resulting secondary current is supplied to a spark plug 65 by an ignition distributor 64.

The ignition distributor 64 is provided with a reference position detection sensor 50 which generates a reference position detection pulse for every 720° CA rotation of its shaft measured in degrees of crankshaft angle (CA), and a crankshaft angle sensor 51 which generates a position detection pulse for every 30° CA. Actual vehicle speed is detected by a vehicle speed sensor 53 that produces output pulses representing the vehicle speed. The engine 20 is cooled by a coolant introduced into a coolant passage 22, and the coolant temperature is detected by a coolant temperature sensor 44.

The burned air/fuel mixture is discharged as exhaust gas into an exhaust manifold 30 through an exhaust valve 26, and then introduced into an exhaust pipe 34. The exhaust pipe 34 is mounted with an A/F sensor 45 for linearly detecting an air-fuel ratio based on the oxygen concentration of the exhaust gas. In the exhaust system further downstream is mounted a catalytic converter 38 which contains a three-way catalyst for simultaneously promoting the oxidation of unburned constituents (HC and CO) and the reduction of nitrogen oxides ($NO_x$) contained in the exhaust gas. The exhaust gas thus purified in the catalytic converter 38 is discharged into the atmosphere.

This engine is of the type that performs sub air-fuel ratio feedback control in order to compensate for variations in the output characteristic of the A/F sensor 45, and an $O_2$ sensor 46 is mounted in the exhaust system downstream of the catalytic converter 38.

Figure 8:
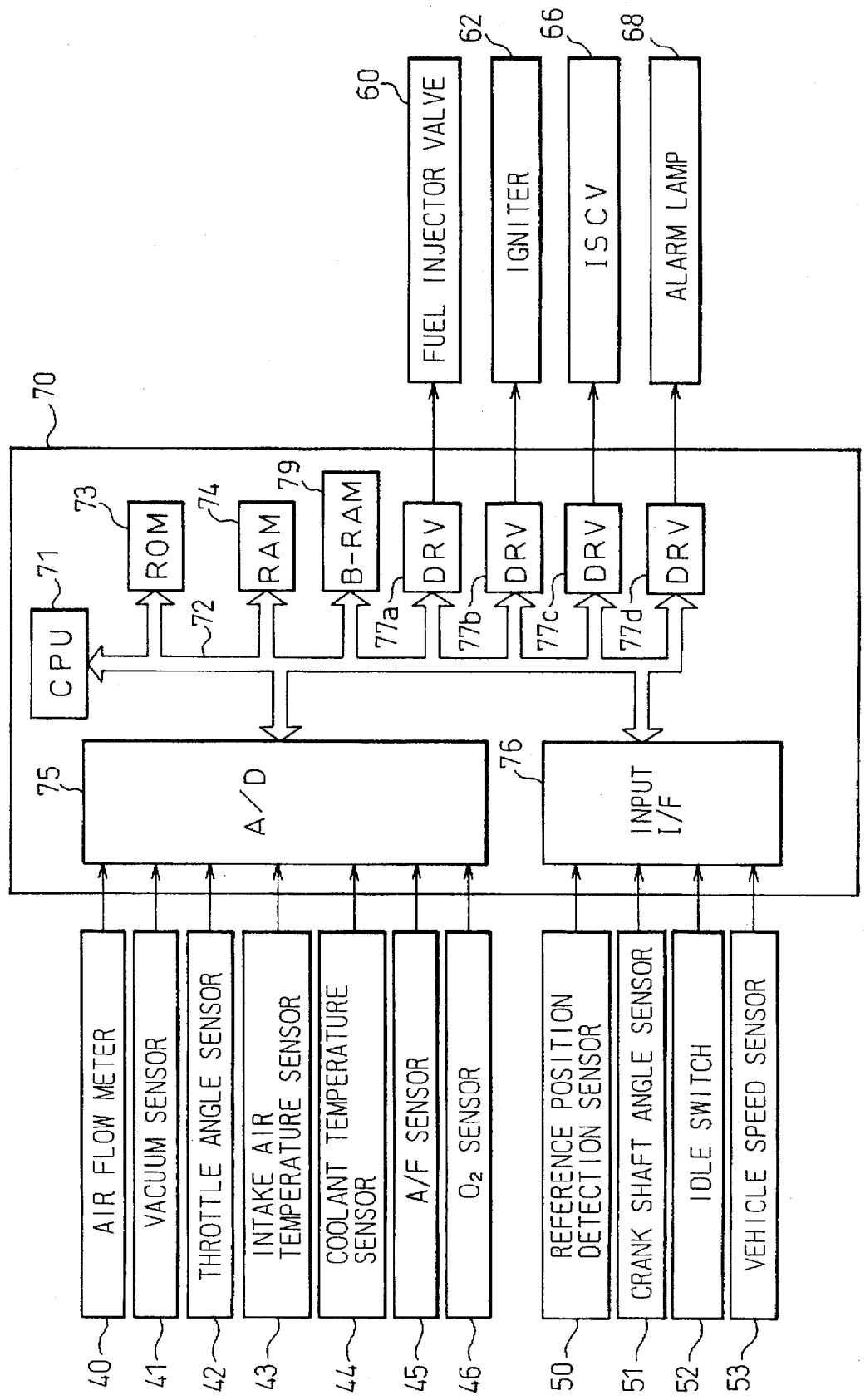
FIG. 8 is a block diagram showing the hardware configuration of an engine ECU according to one embodiment of the present invention.

An engine electronic control unit (engine ECU) 70 is also shown which is a microcomputer system that performs control for the detection of catalyst deterioration contemplated by the invention, as well as fuel injection control, ignition timing control, idle speed control, etc. The hardware configuration is shown in the block diagram of FIG. 8. Signals from the various sensors and switches are input via an A/D conversion circuit 75 or via an input interface circuit 76 to a central processing unit (CPU) 71 which, in accordance with programs and various maps stored in a read-only memory (ROM) 73, performs operations using the input signals, and based on the results of the operations, outputs control signals for the various actuators via respective drive control circuits 77a–77d. A random-access memory (RAM) 74 is used to temporarily store data during the operation and control processes. A backup RAM 79 is supplied with power from a battery (not shown) directly connected to it, and is used to store data (such as various learning values) that should be retained when the ignition switch is off. These constituent parts of the ECU are interconnected by a system bus 72 consisting of an address bus, a data bus, and a control bus.

A description will now be given of the engine control process performed by the ECU 70 for the internal combustion engine having the above-described hardware configuration.

Ignition timing control is performed by sending an ignition signal to the igniter 62 via the drive control circuit 77b after determining optimum ignition timing by comprehensively judging the engine condition based on engine rpm obtained from the crankshaft angle sensor 51 and on signals from other sensors.

In idle speed control, an idle state is detected based on the throttle full-close signal from the idle switch 52 and the vehicle speed signal from the vehicle speed sensor 53, and actual engine rpm is compared with the target rpm calculated according to the engine coolant temperature measured by the coolant temperature sensor 44, etc. Based on the resulting error, the control amount to achieve the target rpm is determined, and the amount of air is adjusted by controlling the ISCV 66 via the drive control circuit 77c, thereby maintaining optimum idle speed.

The detection of catalyst deterioration according to the present invention will be described in detail below, along with the fuel injection control. In the first to third embodiments hereinafter described, determination of the catalyst deterioration is made based on the $O_2$ sensor downstream of the catalyst while erroneous determination due to counter control is prevented. Each embodiment is concerned with an $O_2$ storage amount constant control system using an A/F sensor.

Figure 9:
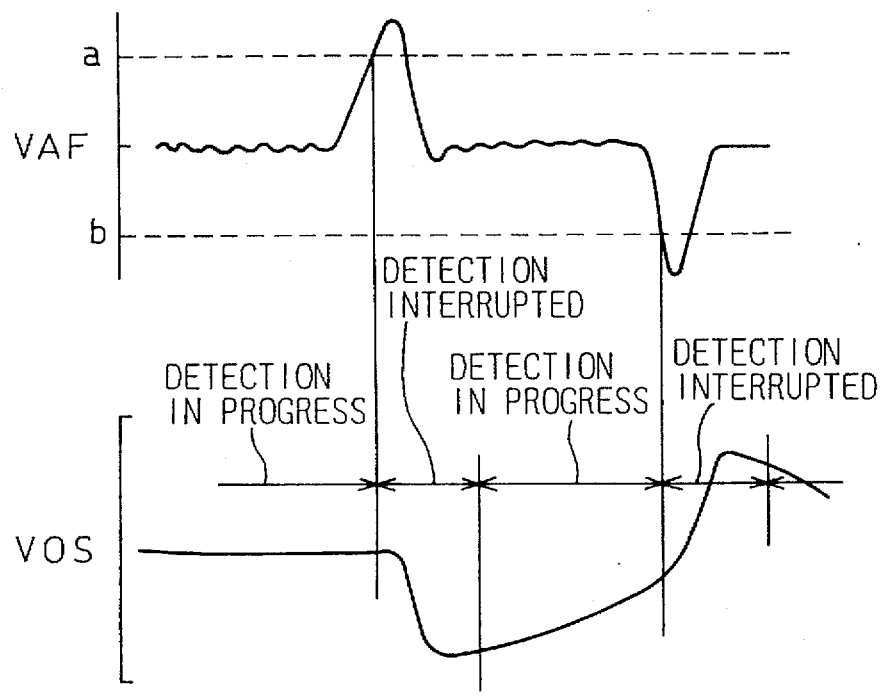
FIG. 9 is a diagram for explaining the principle of a first embodiment.

First, a description will be given of the first embodiment. The principle of the first embodiment is shown in FIG. 9. As shown, in the first embodiment, when the absolute value of the output of the A/F sensor 45 exceeds a limit value (upper limit "a" or lower limit "b") that can cause an excessive response of the $O_2$ sensor 46, the summation of data (the output VOS of the $O_2$ sensor 46) for determination of the catalyst deterioration is interrupted for a prescribed duration of time considering the distance between the two sensors (the time required until the gas detected by the A/F sensor reaches the $O_2$ sensor).

Figure 10:
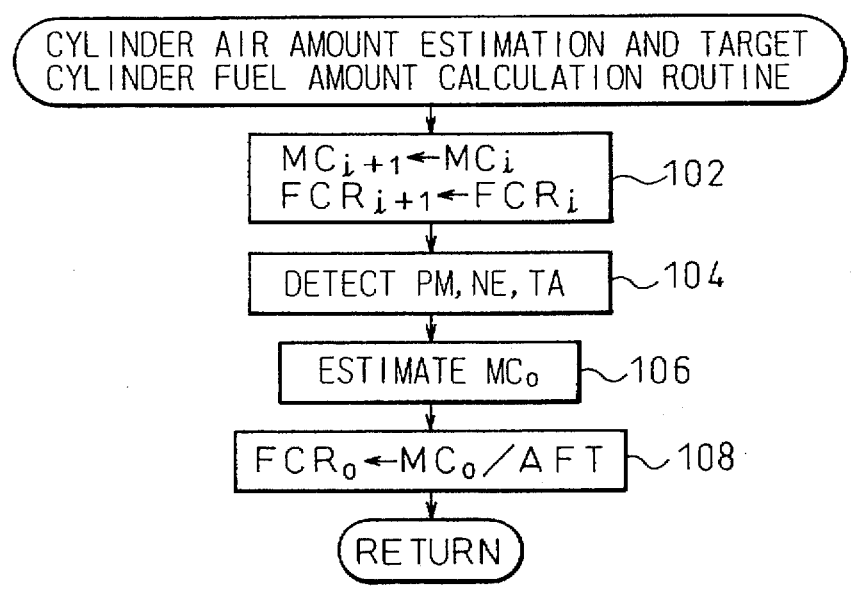
FIG. 10 is a flowchart illustrating a processing sequence for a cylinder air amount estimation and target cylinder fuel amount calculation routine according to the first embodiment.

FIG. 10 is a flowchart illustrating a processing sequence for a cylinder air amount estimation and target cylinder fuel amount calculation routine according to the first embodiment. This routine is executed for every predetermined crankshaft angle. First, cylinder air amount $MC_i$ and target cylinder fuel amount $FCR_i$, obtained from the engine operation up to the previous execution of the routine, are updated.

More specifically, $MC_i$ and $FCR_i$ "i" times back (i=0, 1, ..., n-1) are updated to $MC_{i+1}$ and $FCR_{i+1}$ "i+1" times back (step 102). This is done to store data of the cylinder air amount $MC_i$ and target cylinder fuel amount $FCR_i$ for the previous n times into the RAM 74 and calculate new $MC_0$ and $FCR_0$.

Then, based on the outputs from the vacuum sensor 41, crankshaft angle sensor 51, and throttle angle sensor 42, the present intake manifold pressure PM, engine rpm NE, and throttle angle TA are obtained (step 104). Then, using the data of PM, NE, and TA, the air amount $MC_0$ supplied into the cylinder is estimated (step 106). Usually, the cylinder air amount can be estimated from the intake manifold pressure PM and engine rpm NE, but in this embodiment, provisions are made to detect a transient state based on a change in the value of the throttle angle TA so that an accurate air amount can be calculated in a transient state.

Next, using the cylinder air amount $MC_0$ and stoichiometric air-fuel ratio AFT, the calculation $$FCR_0 \leftarrow MC_0/AFT$$

is performed to calculate the target fuel amount $FCR_0$ that should be supplied into the cylinder to maintain the air/fuel mixture at stoichiometry (step 108). The thus calculated cylinder air amount $MC_0$ and target cylinder fuel amount $FCR_0$ are stored in the RAM 74, as shown in FIG. 11, as the latest data obtained from the present execution of the routine.

Figure 12:
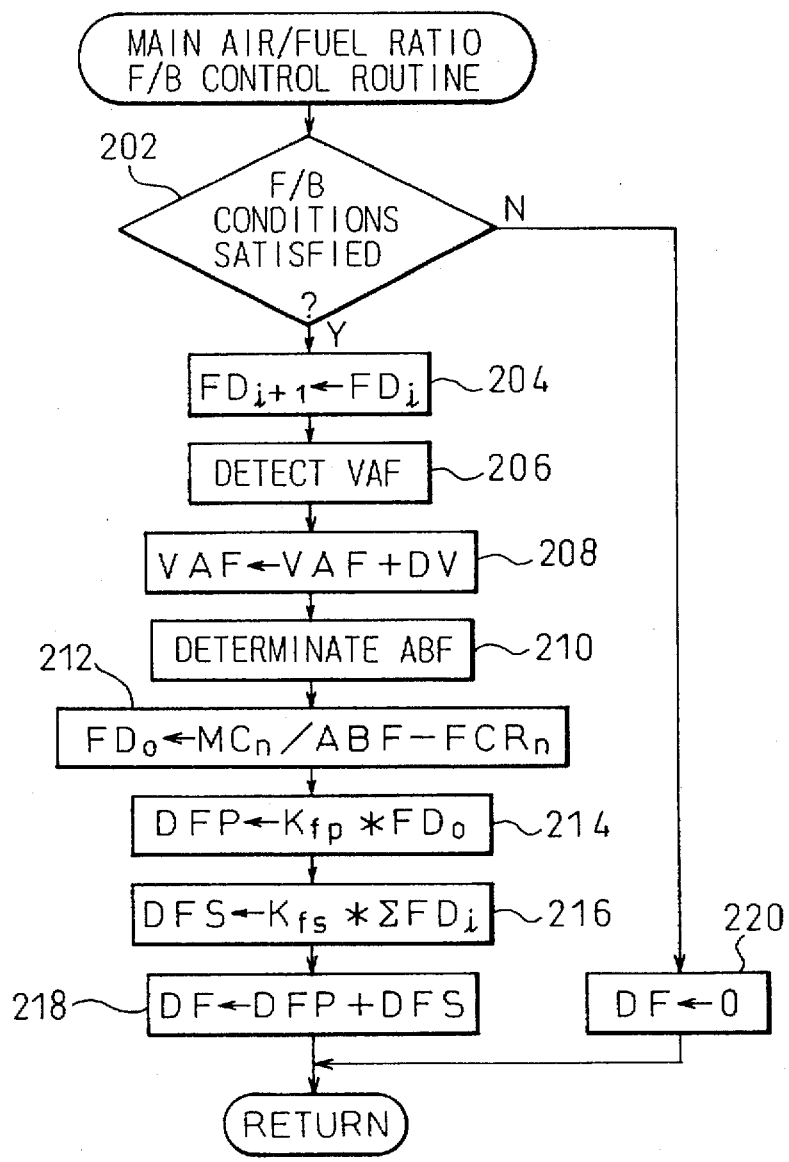
FIG. 12 is a flowchart illustrating a processing sequence for a main air-fuel ratio feedback control routine according to the first embodiment.

FIG. 12 is a flowchart illustrating a processing sequence for a main air-fuel ratio feedback control routine according to the first embodiment. This routine is executed for every predetermined crankshaft angle. First, it is determined whether conditions for feedback are satisfied (step 202). The feedback conditions are not satisfied, for example, when the coolant temperature is below a predetermined value, the engine is being cranked, the quantity of fuel is being increased after engine start or during engine warmup, there is no change in the output signal of the A/F sensor 45, or the fuel is being cut off. In other cases, the conditions are satisfied. When the conditions are not satisfied, the fuel correction amount DF in the feedback control is set to 0 (step 220), and the routine is terminated.

When the feedback conditions are satisfied, the fuel amount error $FD_i$ obtained from engine operation up to the previous execution of the routine (representing the difference between the actually burned fuel amount and the target cylinder fuel amount) is updated. More specifically, $FD_i$ "i" times back (i=0, 1, ..., m-1) is updated to $FD_{i+1}$ "i+1" times back (step 204). This is done to store data of the fuel amount error $FD_i$ for the previous m times into the RAM 74 and calculate new fuel amount error $FD_0$.

Figure 1:
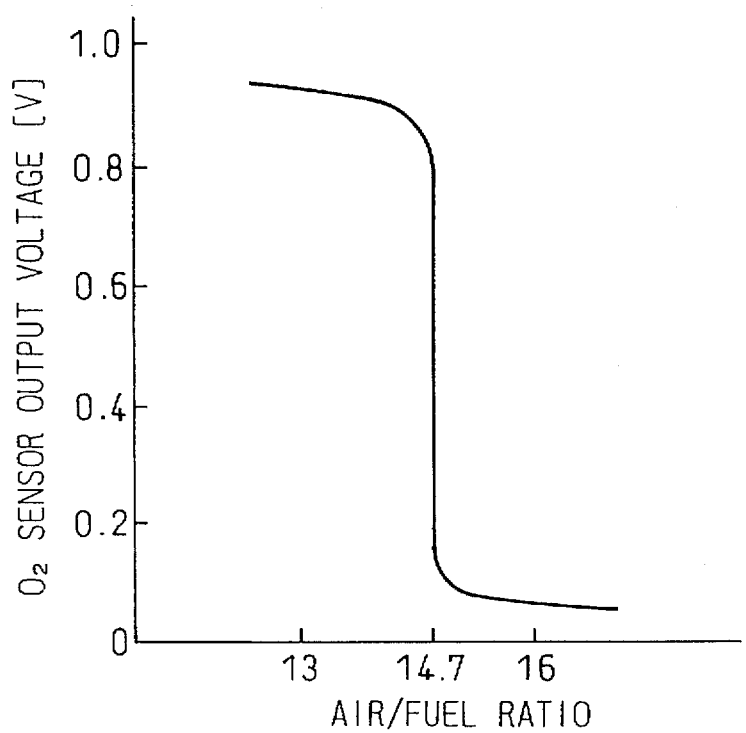
FIG. 1 is a characteristic diagram showing $O_2$ sensor output voltage as a function of air-fuel ratio.
Figure 2:
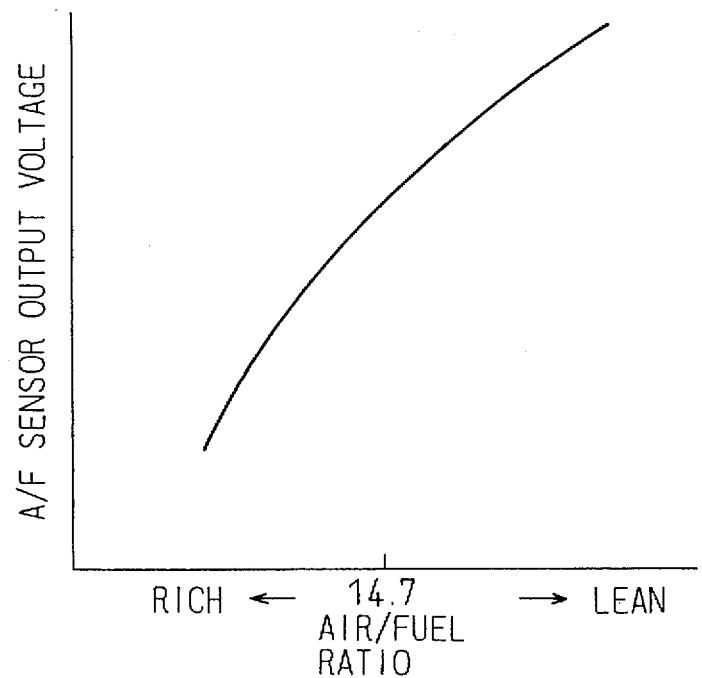
FIG. 2 is a characteristic diagram showing A/F sensor output voltage as a function of air-fuel ratio.
Figure 3:
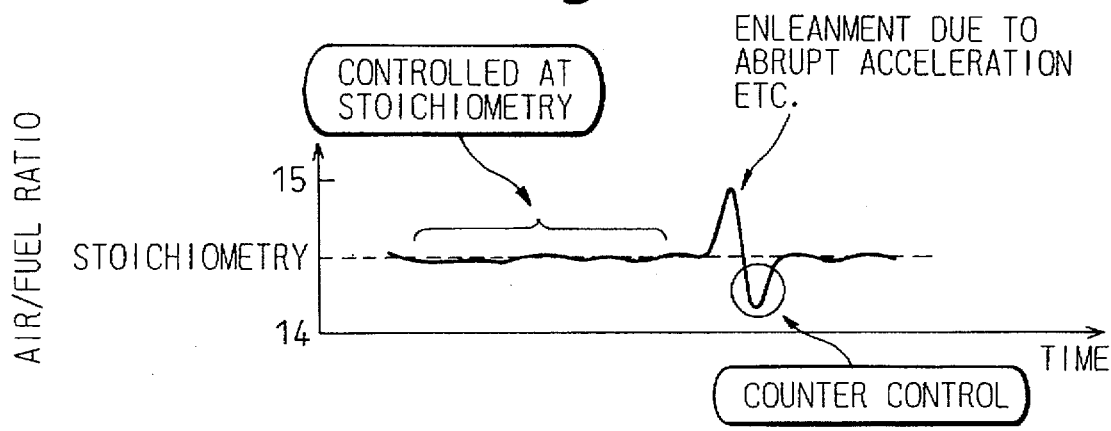
FIG. 3 is a diagram for explaining counter control.
Figure 4A:
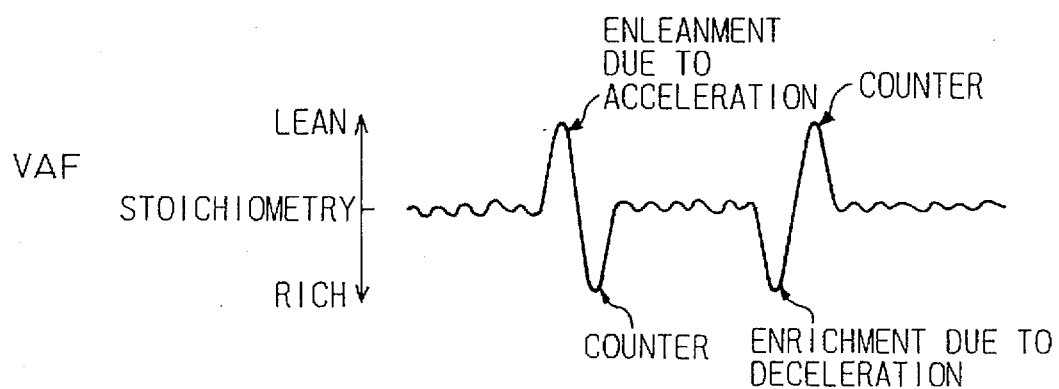
FIG. 4A is a time chart illustrating A/F sensor output voltage VAF.
Figure 4B:
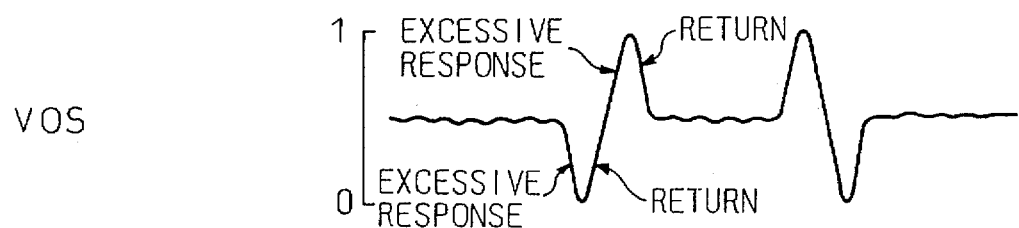
FIG. 4B is a time chart showing $O_2$ sensor output voltage VOS responding to the VAF.

Next, the output voltage value VAF of the A/F sensor 45 is detected (step 206). Then, using the A/F sensor output voltage correction amount DV calculated by the sub air-fuel ratio feedback control described later, the calculation $$VAF \leftarrow VAF + DV$$

is performed to correct the A/F sensor output voltage VAF (step 208). Next, by referencing the characteristic diagram of FIG. 2 based on the corrected VAF, the present air-fuel ratio ABF is determined (step 210). The characteristic diagram of FIG. 2 is converted into a map and stored in advance in the ROM 73.

Next, using the cylinder air amount $MC_n$ and target cylinder fuel amount $FCR_n$ (see FIG. 11) already calculated by the cylinder air amount estimation and target cylinder fuel amount calculation routine, the calculation $$FD_0 \leftarrow MC_n/ABF - FCR_n$$

is performed to obtain the difference between the actually burned fuel amount and the target cylinder fuel amount (step 212). The cylinder air amount $MC_n$ and target cylinder fuel amount $FCR_n$ n times back are used considering the time difference between the air-fuel ratio currently being detected by the A/F sensor and the actual combustion. In other words, such a time difference necessitates storing the cylinder air amount $MC_i$ and target cylinder fuel amount $FCR_i$ for the previous n times.

Next, the calculation $$DFP \leftarrow K_{fp} * FD_0$$

is performed to calculate the proportional term of proportional-integral control (PI control) (step 214). Here, $K_{fp}$ is the proportional gain. Next, the calculation $$DFS \leftarrow K_{fs} * \Sigma FD_i$$

is performed to calculate the integral term of PI control (step 216). Here, $K_{fs}$ is the integral gain. Finally, the calculation $$DF \leftarrow DFP + DFS$$

is performed to determine the fuel correction amount DF applied by the main air-fuel ratio feedback control (step 218).

Figure 13:
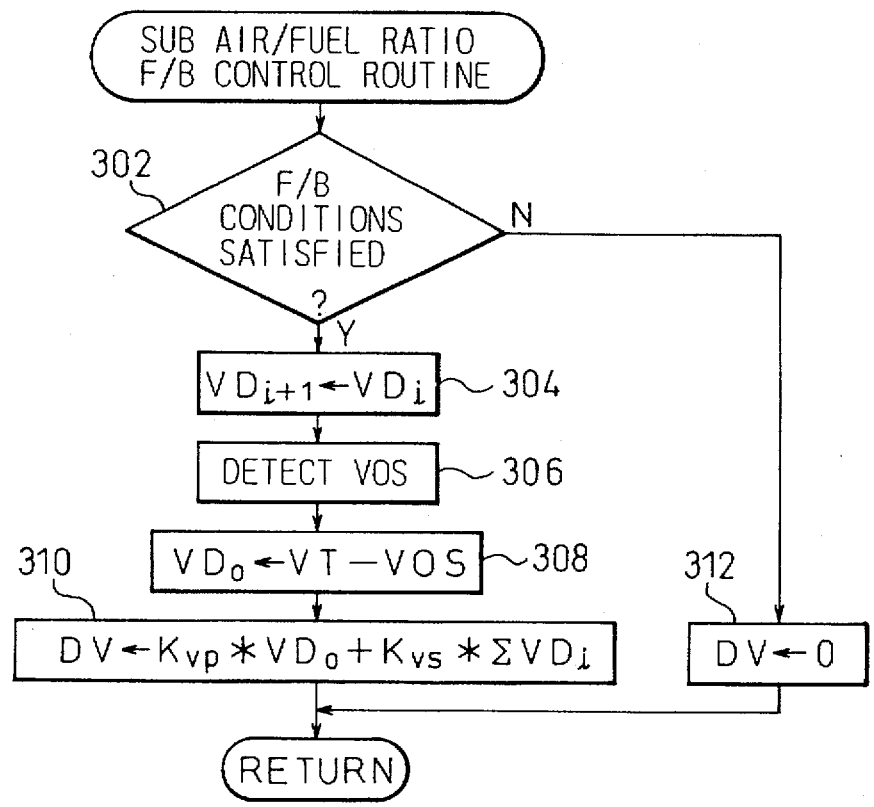
FIG. 13 is a flowchart illustrating a processing sequence for a sub air-fuel ratio feedback control routine according to the first embodiment.

FIG. 13 is a flowchart illustrating a processing sequence for the sub air-fuel ratio feedback control routine according to the first embodiment. This routine is executed at prescribed intervals of time longer than the intervals at which the main air-fuel ratio feedback control routine is executed. First, similarly to the main air-fuel ratio feedback control, it is determined whether conditions for sub air-fuel ratio feedback control are satisfied (step 302). If the conditions are not satisfied, the A/F sensor output voltage correction amount DV is set to 0 (step 312), and the routine is terminated.

When the feedback conditions are satisfied, the voltage error $VD_i$ obtained from engine operation up to the previous execution of the routine (representing the difference between the target $O_2$ sensor output voltage and the actually detected $O_2$ sensor output voltage) is updated. More specifically, $VD_i$ "i" times back (i=0, 1, ..., p−1) is updated to $VD_{i+1}$ "i+1" times back (step 304). This is done to store data of the voltage error $VD_i$ for the previous p times into the RAM 74 and calculate a new voltage error $VD_0$.

Next, the output voltage VOS of the $O_2$ sensor 46 is detected (step 306). Then, using the VOS and the target $O_2$ sensor output voltage VT (for example, 0.5 V), the calculation $$VD_0 \leftarrow VT - VOS$$

is performed to obtain the latest voltage error $VD_0$ (step 308).

Finally, the calculation $$DV \leftarrow K_{vp} * VD_0 + K_{vs} * \Sigma VD_i$$

is performed to determine the A/F sensor output voltage correction amount DV applied by PI control (step 310). Here, $K_{vp}$ and $K_{vs}$ are the proportional and integral gains, respectively. The thus determined correction amount DV is used to compensate for variations in the output characteristic of the A/F sensor in the main air-fuel ratio feedback control routine, as previously described.

Figure 14:
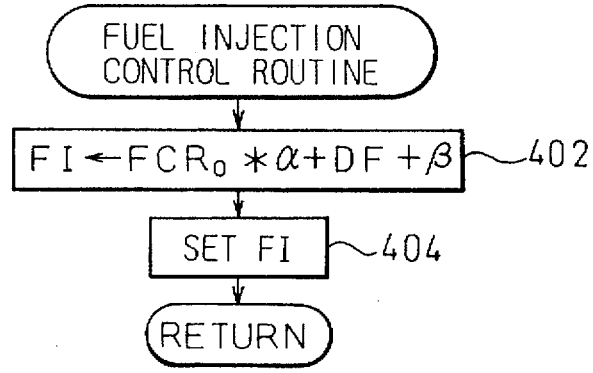
FIG. 14 is a flowchart illustrating a processing sequence for a fuel injection control routine according to the first embodiment.

FIG. 14 is a flowchart illustrating a processing sequence for a fuel injection control routine according to the first embodiment. This routine is executed for every predetermined crankshaft angle. First, using the target cylinder fuel amount $FCR_0$ calculated in the cylinder air amount and target cylinder fuel amount calculation routine, and the feedback correction amount DF calculated in the main air-fuel ratio feedback control routine, the calculation $$FI \leftarrow FCR_0 * \alpha + DF + \beta$$

is performed to determine the fuel injection amount FI (step 402). Here, $\alpha$ and $\beta$ are a multiplication coefficient and an addition correction amount, respectively, which are determined by other engine operating parameters. For example, $\alpha$ includes basic corrections based on signals from various sensors such as the intake air temperature sensor 43, coolant temperature sensor 44, etc., while $\beta$ includes corrections based on changes in the amount of fuel adhering to wall surfaces (this amount changes with changing intake manifold pressure in a transient driving condition). Finally, the determined fuel injection amount FI is set in the drive control circuit 77a for the fuel injection valve 60 (step 404).

Figure 15A:
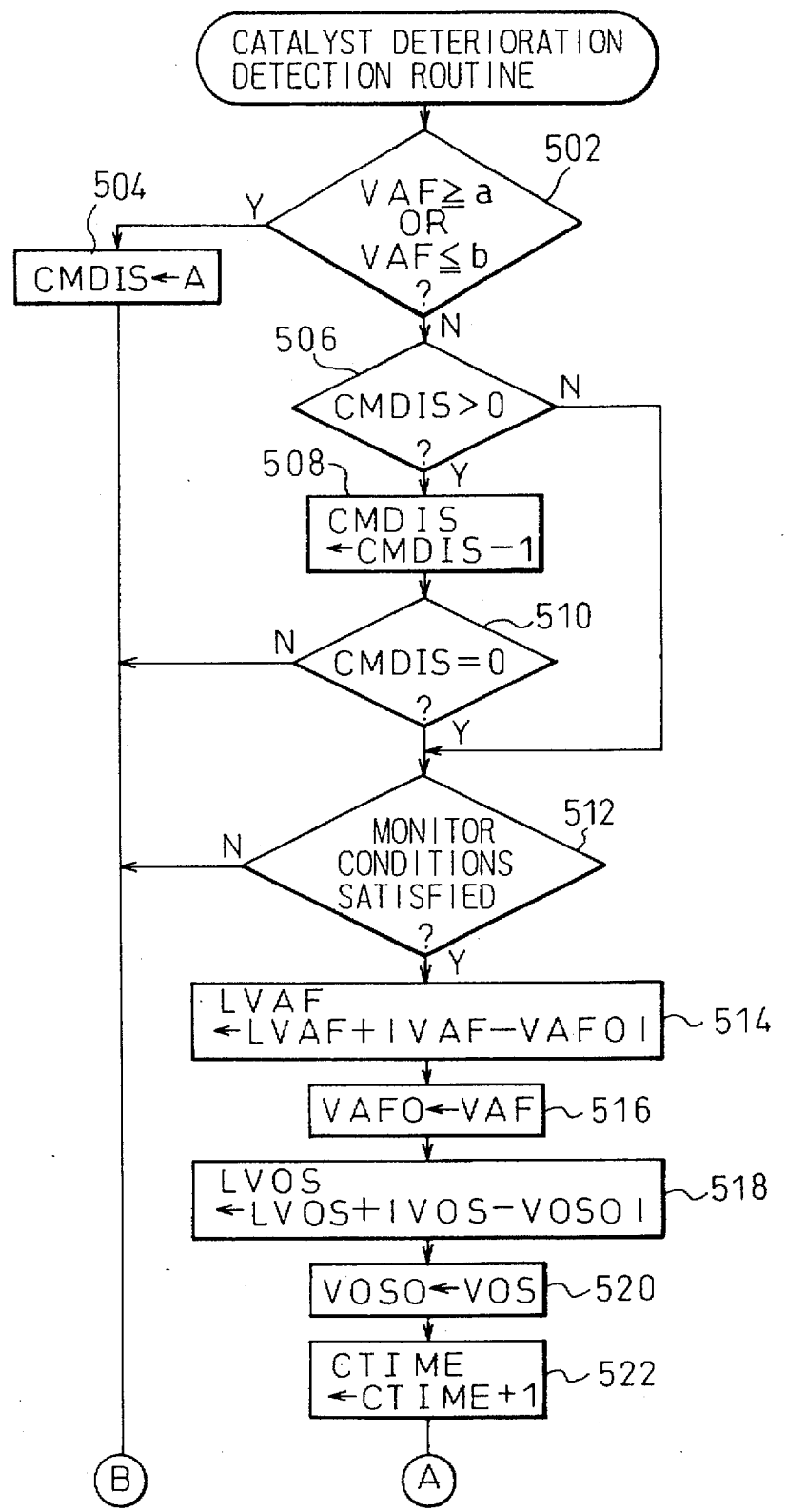
FIGS. 15A and 15B show a flowchart illustrating a processing sequence for a catalyst deterioration detection routine according to the first embodiment.
Figure 15B:
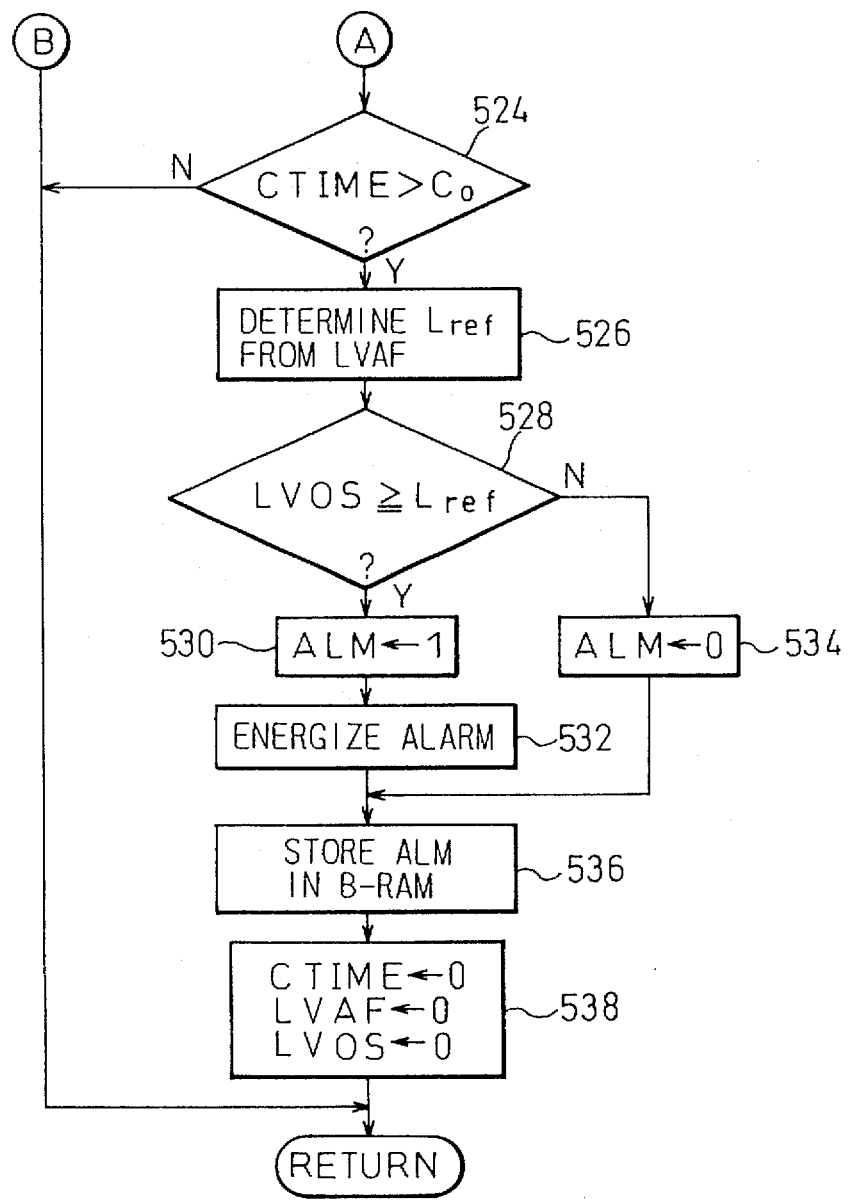

FIGS. 15A and 15B show a flowchart illustrating a processing sequence for a catalyst deterioration detection routine according to the first embodiment. This routine is executed at prescribed intervals of time. First, it is detected whether or not the output voltage VAF of the A/F sensor 45 is equal to or larger in magnitude than the upper limit value "a" or lower limit value "b" (step 502). If VAF≧a or VAF≦b, then a designated monitor disable counter CMDIS is set to a prescribed value A (step 504), and the routine is terminated.

If a<VAF<b, it is determined whether the value of the monitor disable counter CMDIS is positive or not (step 506). If CMDIS>0, the process proceeds to step 508; if CMDIS≦0, the process proceeds to step 512. In step 508, CMDIS is decremented, and in the next step 510, it is determined if CMDIS is 0 or not. If it is not 0, the routine is terminated; if it is 0, the process proceeds to step 512. In step 512, it is determined whether or not monitor conditions for the determination of deterioration are satisfied. If the monitor conditions are not satisfied, the routine is terminated; if the monitor conditions are satisfied, the process proceeds to step 514 and on to subsequent steps.

In step 514, the response curve length LVAF of the output VAF of the A/F sensor 45 is calculated by $$LVAF \leftarrow LVAF + |VAF - VAFO|$$

In the next step 516, $$VAFO \leftarrow VAF$$

to prepare for the next execution of the routine.

In step 518, the response curve length LVOS of the output VOS of the $O_2$ sensor 46 is calculated by $$LVOS \leftarrow LVOS + |VOS - VOSO|$$

In the next step 520, $$VOSO \leftarrow VOS$$

to prepare for the next execution of the routine.

Next, a designated counter CTIME is incremented (step 522), and it is determined whether a predetermined value $C_0$ is exceeded or not (step 524). If CTIME>$C_0$, the process proceeds to step 526; if CTIME≧$C_0$, the routine is terminated. At step 526, a deterioration determination reference value $L_{ref}$ is determined from LVAF. The reason the deterioration determination reference value $L_{ref}$ is determined based on LVAF is that, when determining the deterioration of the catalyst based on the response curve length LVOS of the output VOS of the $O_2$ sensor 46, the determination reference value used to discriminate between normal and deteriorated catalyst conditions varies depending on the response curve length LVAF of the output VAF of the A/F sensor 45. The reference value $L_{ref}$ is converted into a map and stored in advance in the ROM 73. Next, in step 528, it is determined whether or not the response curve length LVOS of the output VOS of the $O_2$ sensor 46 is equal to or larger than the deterioration determination reference value $L_{ref}$. If LVOS≧$L_{ref}$, it is determined that the catalyst is deteriorated, and a designated alarm flag ALM is set to 1 (step 530), while at the same time, an alarm lamp 68 (see FIGS. 7 and 8) is turned on (step 532). If LVOS<$L_{ref}$, it is determined that the catalyst is not deteriorated, and the alarm flag ALM is set to 0 (step 534). The alarm flag ALM is stored in the backup RAM 79 (step 536) so that it can be recovered at the time of repair or inspection. Finally, CTIME, LVAF, and LVOS are cleared to prepare for the next execution of the catalyst deterioration determination process (step 538).

According to the first embodiment described above, since the interval during which the amount of change of the $O_2$ sensor output increases greatly is masked, the accuracy of the catalyst deterioration diagnosis improves. In the first embodiment, such an interval is masked when the output voltage VAF of the A/F sensor 45 goes outside the range defined by the upper limit value "a" and lower limit value "b"; alternatively, provisions may be made to mask the interval when the absolute value of the amount of change of VAF, |ΔVAF|, exceeds a prescribed value.

The second embodiment will now be described. In the first embodiment, the calculation of the response curve length was masked during a specific interval in the catalyst deterioration determination process. In contrast, in the second embodiment, the counter control is limited during the execution of the catalyst deterioration determination process, that is, an upper limit is imposed on the absolute value of the integral term of the fuel correction amount, thereby making the output of the $O_2$ sensor return slowly to stoichiometry, as shown in FIG. 16, and thus preventing an excessive response.

In the second embodiment, the cylinder air amount estimation and target cylinder fuel amount calculation routine, the sub feedback air-fuel ratio control routine, and the fuel injection amount control routine are the same as those used in the first embodiment, but the catalyst deterioration detection routine and the main air-fuel ratio feedback control routine are modified from the corresponding routines used in the first embodiment.

Figure 17A:
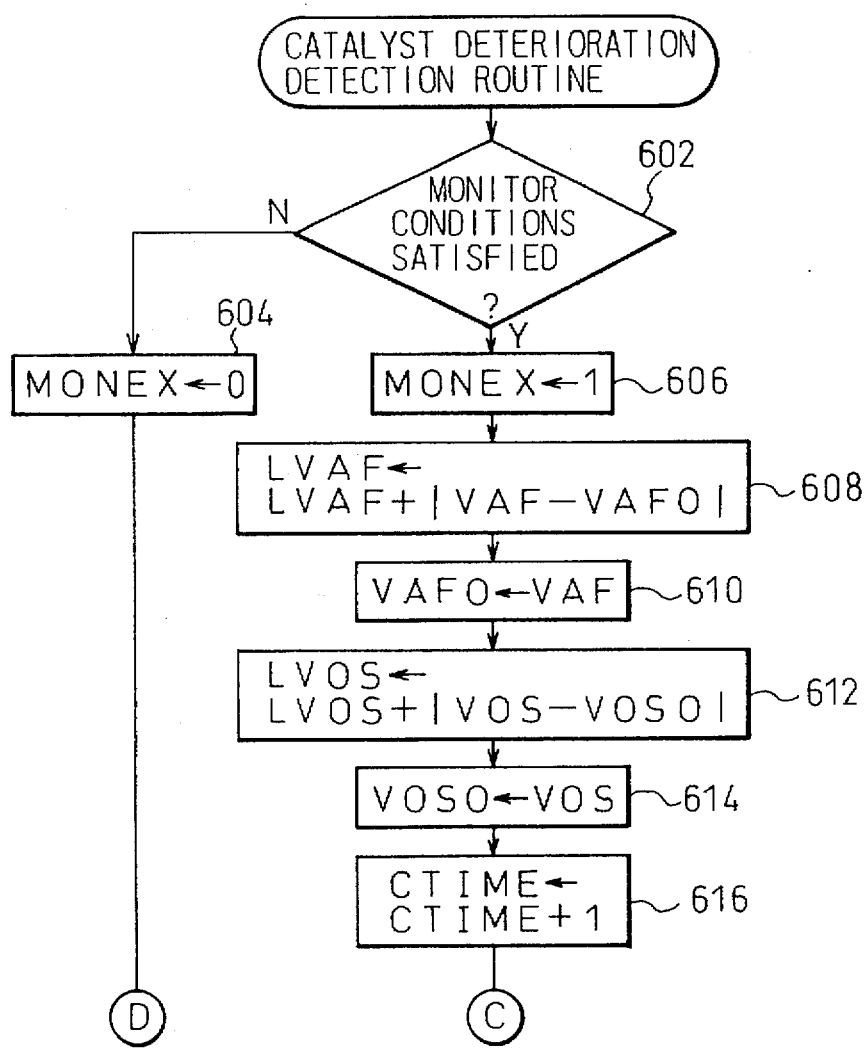
FIGS. 17A and 17B show a flowchart illustrating a processing sequence for a catalyst deterioration detection routine according to the second embodiment.
Figure 17B:
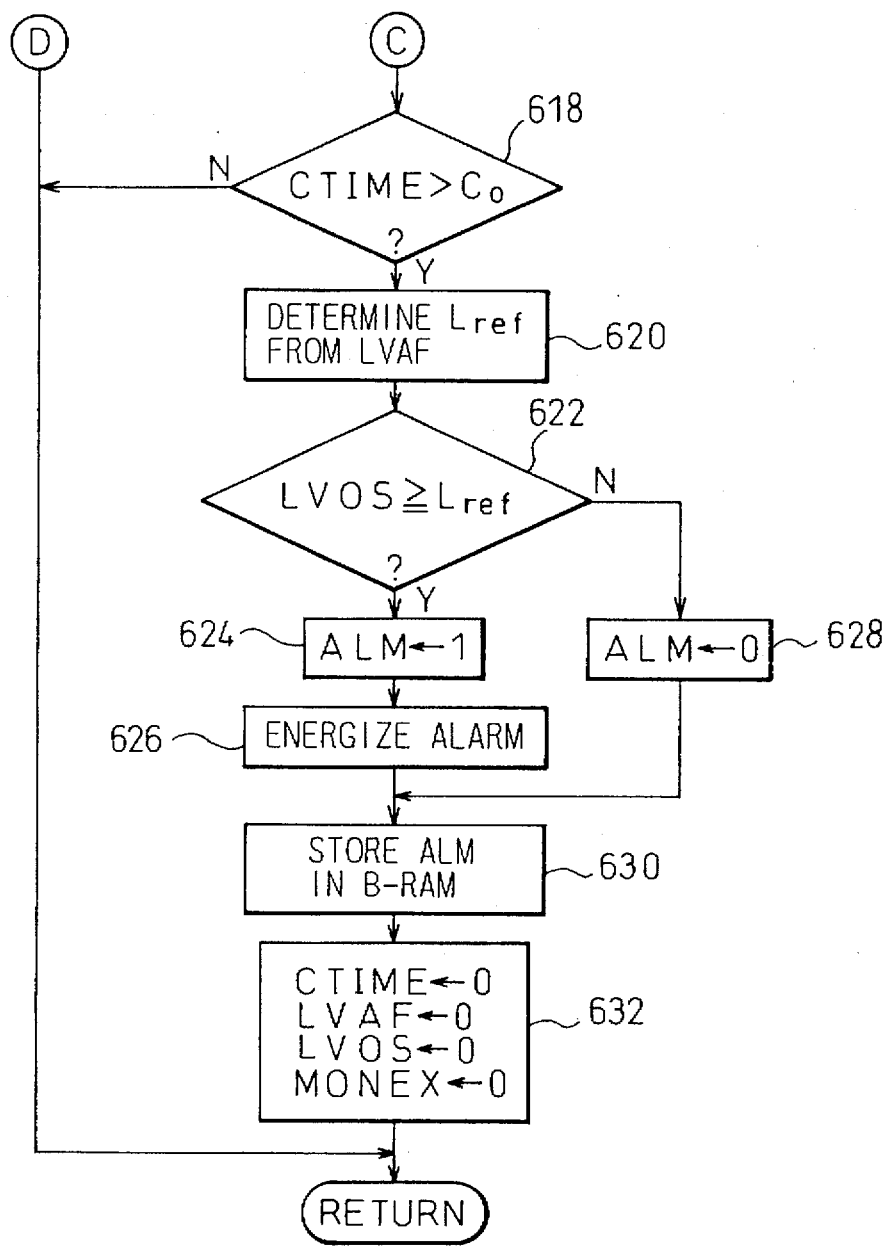

FIGS. 17A and 17B show a flowchart illustrating a processing sequence for the catalyst deterioration detection routine according to the second embodiment. Only the differences between the flowchart of FIGS. 15A and 15B in the first embodiment and FIGS. 17A and 17B will be described. First, steps 502 to 510 for judging the conditions for the A/F sensor output voltage are eliminated. Instead, steps 604 and 606 are added next to the step 602 for judging the monitor conditions. That is, if the monitor conditions are not satisfied, a monitor execution progress flag MONEX is set to 0, and if the monitor conditions are satisfied, MONEX is set to 1. Steps 608 to 630 are the same as the steps 514 to 536 in the first embodiment. In step 632, processing for clearing MONEX is added to the processing in step 538. In this way, in the second embodiment, the catalyst deterioration determination is carried out without regard to the value of VAF, and during execution, the monitor execution progress flag MONEX is set to 1.

Figure 18:
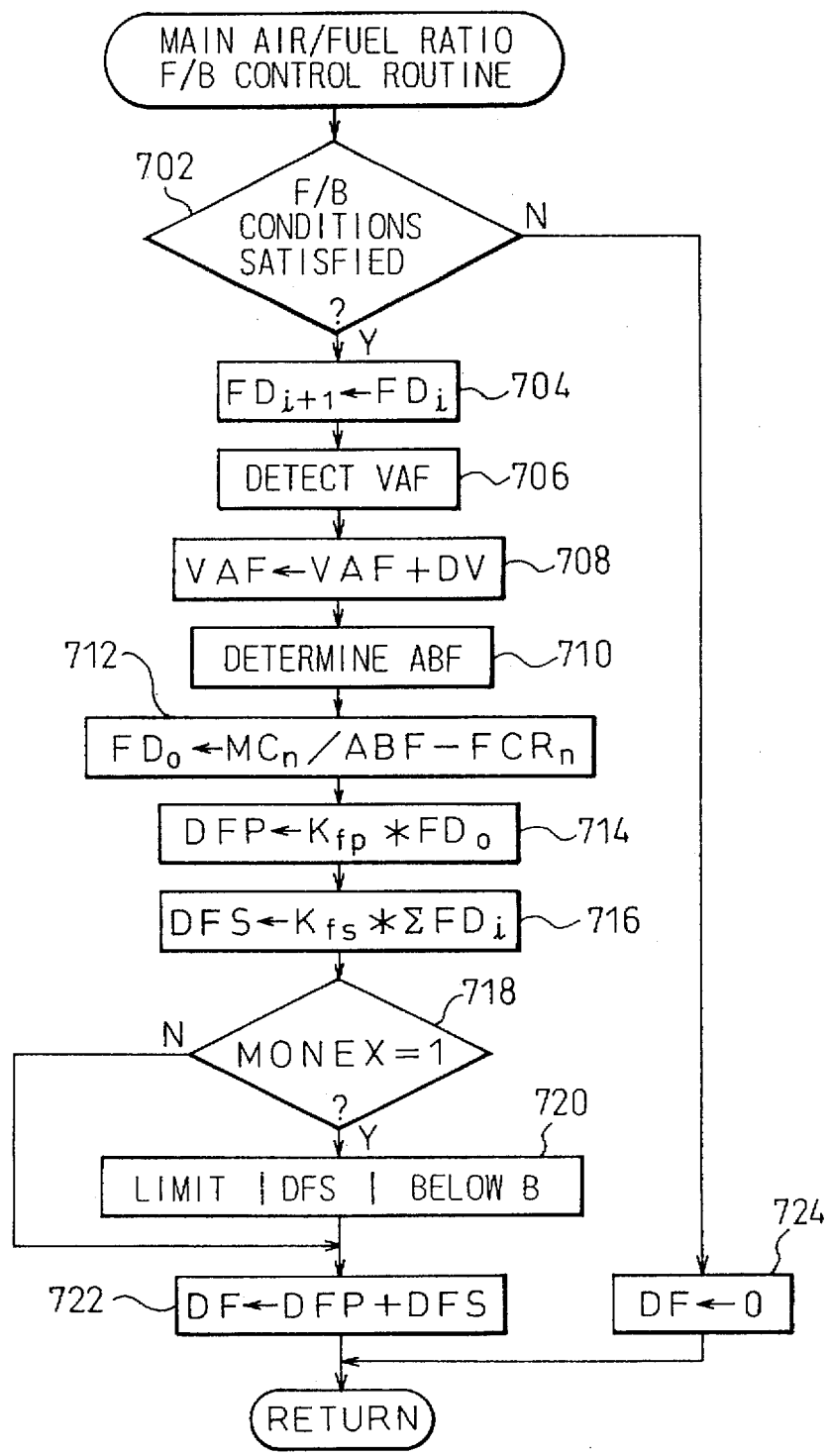
FIG. 18 is a flowchart illustrating a processing sequence for a main air-fuel ratio feedback control routine according to the second embodiment.

FIG. 18 is a flowchart illustrating the main air-fuel ratio feedback control routine according to the second embodiment. The only difference from the flowchart of FIG. 12 in the first embodiment is the addition of steps 718 and 720. That is, after the integral term DFS of the fuel correction amount DF is calculated in step 716, if the catalyst deterioration determination process is in progress (MONEX=1), the absolute value of the integral term, |DFS|, is limited to below a predetermined value B.

In this way, the variation of the air-fuel ratio is suppressed, which makes the output of the $O_2$ sensor return slowly to stoichiometry, eliminates an excessive response, and improves the accuracy of the diagnosis. As a modified example of the second embodiment, control may be performed so that the gain $K_{fs}$ of the integral term DFS is reduced during the execution of the catalyst deterioration determination process.

Next, the third embodiment will be described. In the third embodiment, the output correction of the A/F sensor applied based on the output of the $O_2$ sensor is inhibited during the execution of the catalyst deterioration determination process, thereby making the output of the $O_2$ sensor return slowly to stoichiometry, and thus preventing an excessive response, as in the second embodiment. In the third embodiment, the cylinder air amount estimation and target cylinder fuel amount calculation routine is the same as that used in the first and second embodiments, the main air-fuel ratio feedback control routine is the same as that used in the first embodiment, the fuel injection control routine is the same as that used in the first and second embodiments, and the catalyst deterioration detection routine is the same as that used in the second embodiment; only the sub air-fuel ratio feedback control routine is modified.

Figure 19:
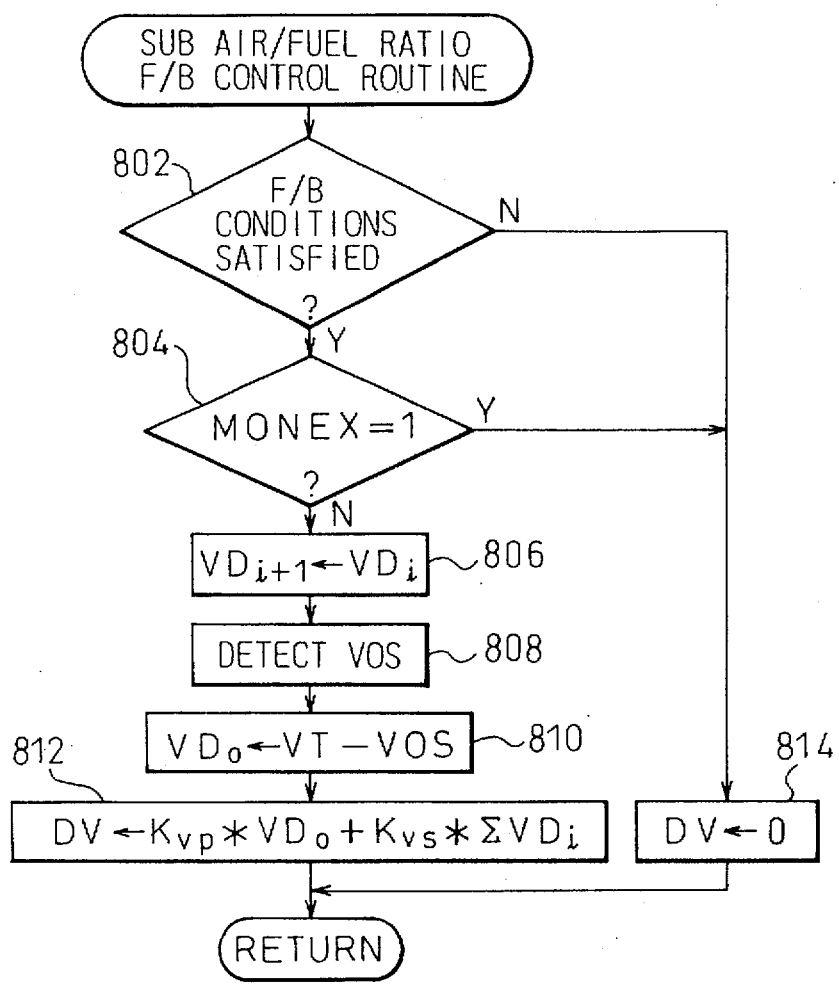
FIG. 19 is a flowchart illustrating a processing sequence for a sub air-fuel ratio feedback control routine according to a third embodiment.

FIG. 19 is a flowchart illustrating a processing sequence for the sub air-fuel ratio feedback control routine according to the third embodiment. The only difference from the flowchart of FIG. 13 in the first embodiment is the addition of step 804. That is, when the catalyst deterioration determination process is in progress (MONEX=1), the A/F sensor output voltage correction amount DV is set to 0, so that no correction is applied to the output voltage VAF of the A/F sensor 45. In this way, the output of the $O_2$ sensor is made to return slowly to stoichiometry, an excessive response is eliminated, and the accuracy of the diagnosis improves.

Figure 6A:
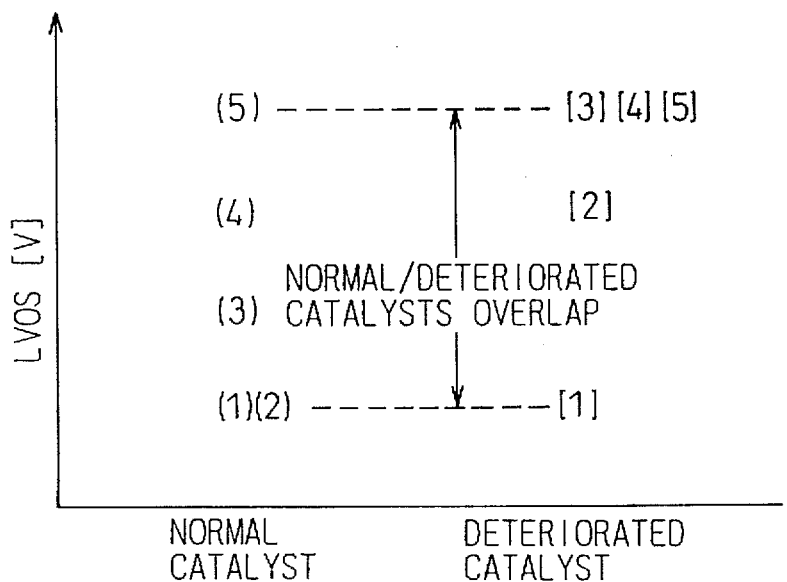
FIG. 6A is a diagram showing the distribution of data of the output response curve length LVOS of the $O_2$ sensor in FIG. 5, and FIG. 6B a diagram showing the distribution of data of the ratio of the output response curve length of the $O_2$ sensor to that of the A/F sensor, LVOS/LVAF, in FIG. 5.
Figure 6B:
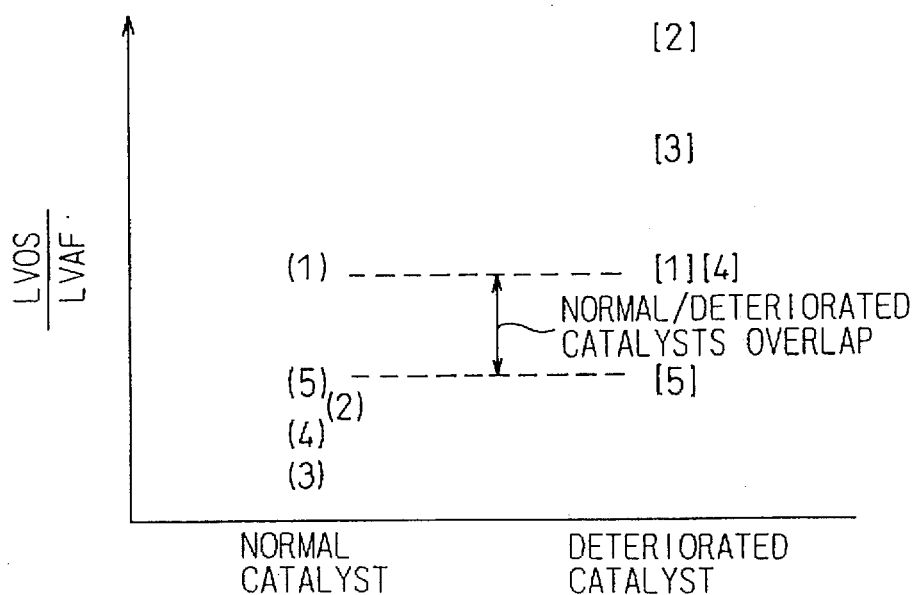
Figure 20A:
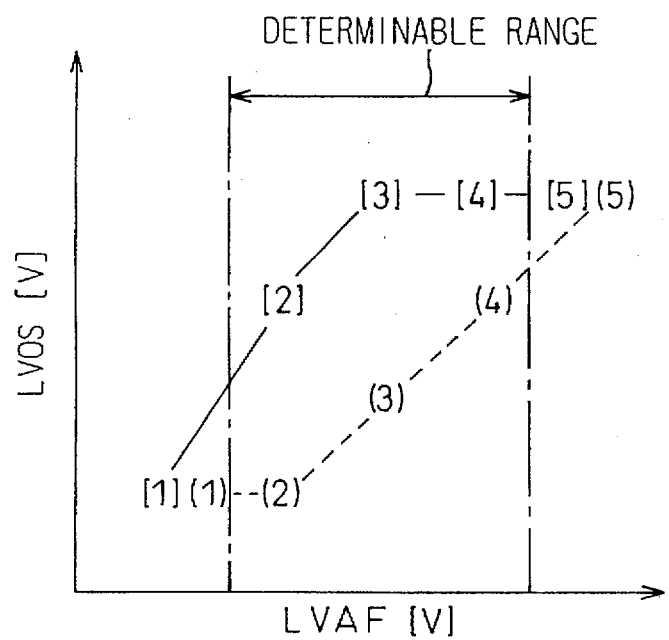
FIGS. 20A and 20B are diagrams for explaining the principles of fourth and fifth embodiments, respectively.
Figure 20B:
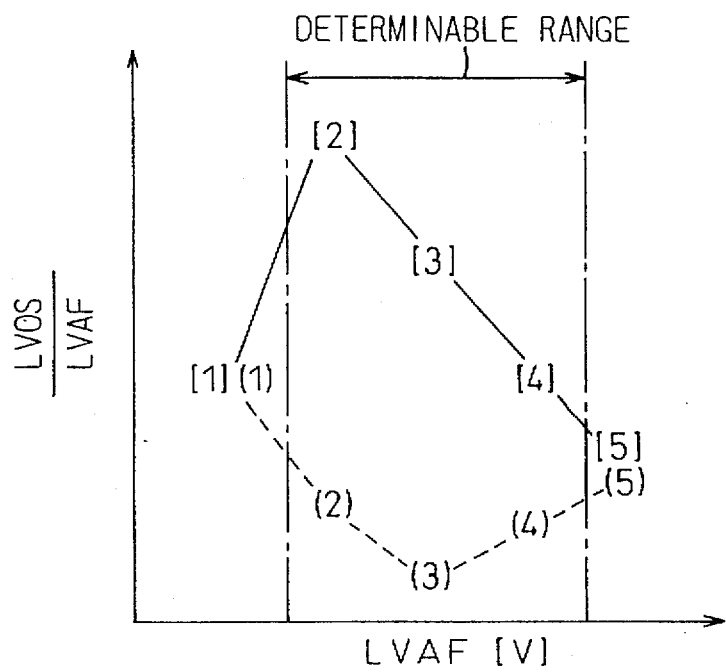

The fourth and fifth embodiments hereinafter described are both intended to achieve an accurate determination of catalyst deterioration based on the output of the $O_2$ sensor downstream of the catalyst, regardless of the variation amplitude of the air-fuel ratio of the mixture entering the catalyst. FIGS. 6A and 6B, previously given, simply plotted the data of FIG. 5 in one dimension by taking the response curve length LVOS or the response curve length ratio LVOS/LVAF along the ordinate. When the same data are plotted in two dimensions by taking the response curve length LVAF of the A/F sensor output along the abscissa, the results will be as shown in FIGS. 20A and 20B. It is shown that within a specific range of LVAF, a threshold value for discriminating between normal and deteriorated catalyst conditions can be set. Instead of LVAF, the amplitude of the output variation may be employed, since the amplitude of the output variation is substantially proportional to the response curve length LVAF of the A/F sensor output. In the fourth and fifth embodiment, the catalyst deterioration determining operation based on the output of the $O_2$ sensor downstream of the catalyst is performed when the length of the response curve of the A/F sensor output is within a predetermined range.

The processing routine for the catalyst deterioration determination according to the fourth and fifth embodiments will be described below. In the fourth and fifth embodiments, the cylinder air amount estimation and target cylinder fuel amount calculation routine, the main air-fuel ratio feedback control routine, the sub feedback air-fuel ratio control routine, and the fuel injection control routine are respectively the same as those shown in FIGS. 10, 12, 13, and 14, and only the catalyst deterioration detection routine is newly produced.

Figure 22A:
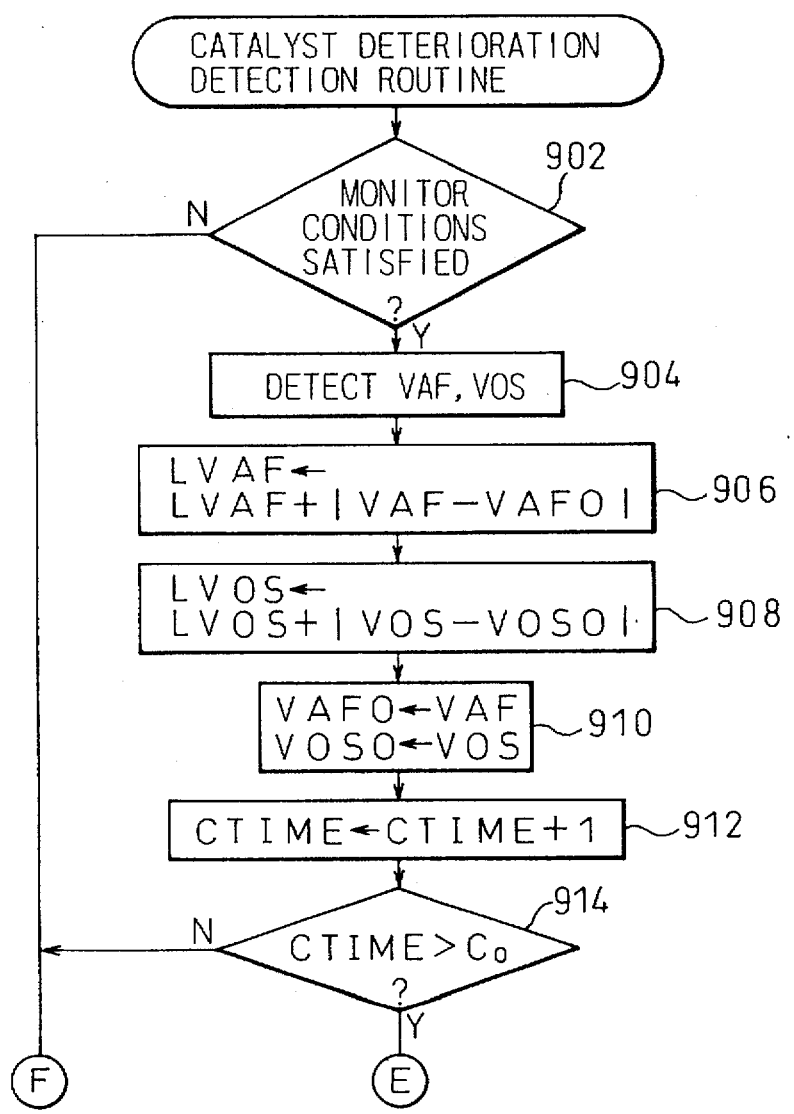
FIGS. 22A and 22B show a flowchart illustrating a processing sequence for a catalyst deterioration detection routine according to the fourth embodiment.
Figure 22B:
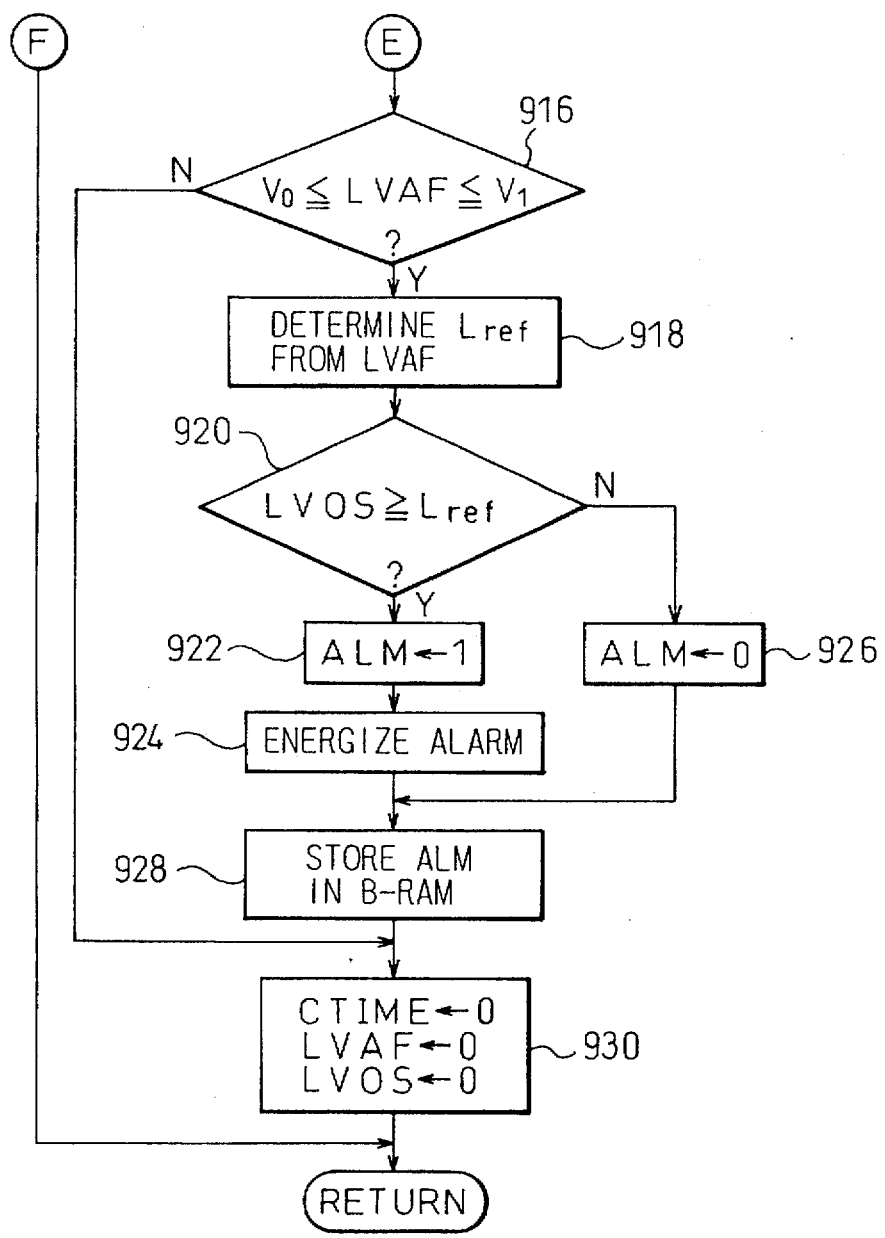

In the fourth embodiment, determination of the deterioration of the catalyst is made based on the response curve length LVOS of the output of the $O_2$ sensor 46, and the catalyst deterioration determination reference value $L_{ref}$ used for that purpose is determined according to the response curve length LVAF of the output of the A/F sensor 45, as shown in FIG. 21. The reference value $L_{ref}$ is converted into a map and stored in advance in the ROM 73. FIGS. 22A and 22B show a flowchart illustrating the catalyst deterioration detection routine according to the fourth embodiment. This routine is executed at prescribed intervals of time.

First, in step 902, it is determined whether or not monitor conditions for the deterioration determination are satisfied; if the monitor conditions are not satisfied, the routine is terminated, and if the monitor conditions are satisfied, the process proceeds to step 904 and on to subsequent steps. The monitor conditions are: the main air-fuel ratio feedback control based on the output of the A/F sensor 45 is in progress; the sub air-fuel ratio feedback control based on the output of the $O_2$ sensor 46 is in progress; and the engine load is above a predetermined value.

In step 904, the output voltage VAF of the A/F sensor 45 and the output voltage VOS of the $O_2$ sensor 46 are detected. Next, in step 906, the response curve length LVAF of VAF is updated by the calculation

LVAF←LVAF+|VAF−VAFO|

Next, in step 908, the response curve length LVOS of VOS is updated by the calculation

LVOS←LVOS+|VOS−VOSO|

Next, in step 910,

VAFO←VAF

VOSO←VOS to prepare for the next execution of the routine. In calculating the response curve length LVAF of the A/F sensor, provisions may be made to stop the summation of the response curve lengths LVAF and LVOS (holding the result of the summation) when the difference between the maximum and minimum values of the A/F sensor output (the amplitude of the output) momentarily exceeds a threshold value, and to resume the summation when it drops below the threshold value.

Next, in step 912, the counter CTIME for measuring monitor time is incremented, and in step 914, it is determined whether or not the counter value has exceeded the predetermined value $C_0$. If CTIME>$C_0$, the process proceeds to step 916, and if CTIME≦$C_0$, the routine is terminated. In step 916, it is determined whether or not $V_0$≦LVAF≦$V_1$ is satisfied, that is, whether or not the present value of LVAF is within the catalyst deterioration determinable region shown in FIG. 21. If it is not within that region, the present catalyst deterioration determining operation is abandoned, and the process proceeds to step 930. On the other hand, if the value is within that region, the process proceeds to step 918.

In step 918, by referencing the map shown in FIG. 21, the deterioration determination reference value $L_{ref}$ is determined based on the value of LVAF. Next, in step 920, it is determined whether or not the response curve length LVOS of the $O_2$ sensor output is equal to or larger than the deterioration determination reference value $L_{ref}$. If LVOS≧$L_{ref}$, it is determined that the catalyst is deteriorated, and the designated alarm flag ALM is set to 1 (step 922), while at the same time, the alarm lamp 68 (see FIGS. 7 and 8) is turned on (step 924). If LVOS<$L_{ref}$, it is determined that the catalyst is not deteriorated, and the alarm flag ALM is set to 0 (step 926). The alarm flag ALM is stored in the backup RAM 79 (step 928) so that it can be recovered at the time of repair or inspection. Finally, in step 930, CTIME, LVAF, and LVOS are cleared to prepare for the next execution of the catalyst deterioration determination process.

Figure 24B:
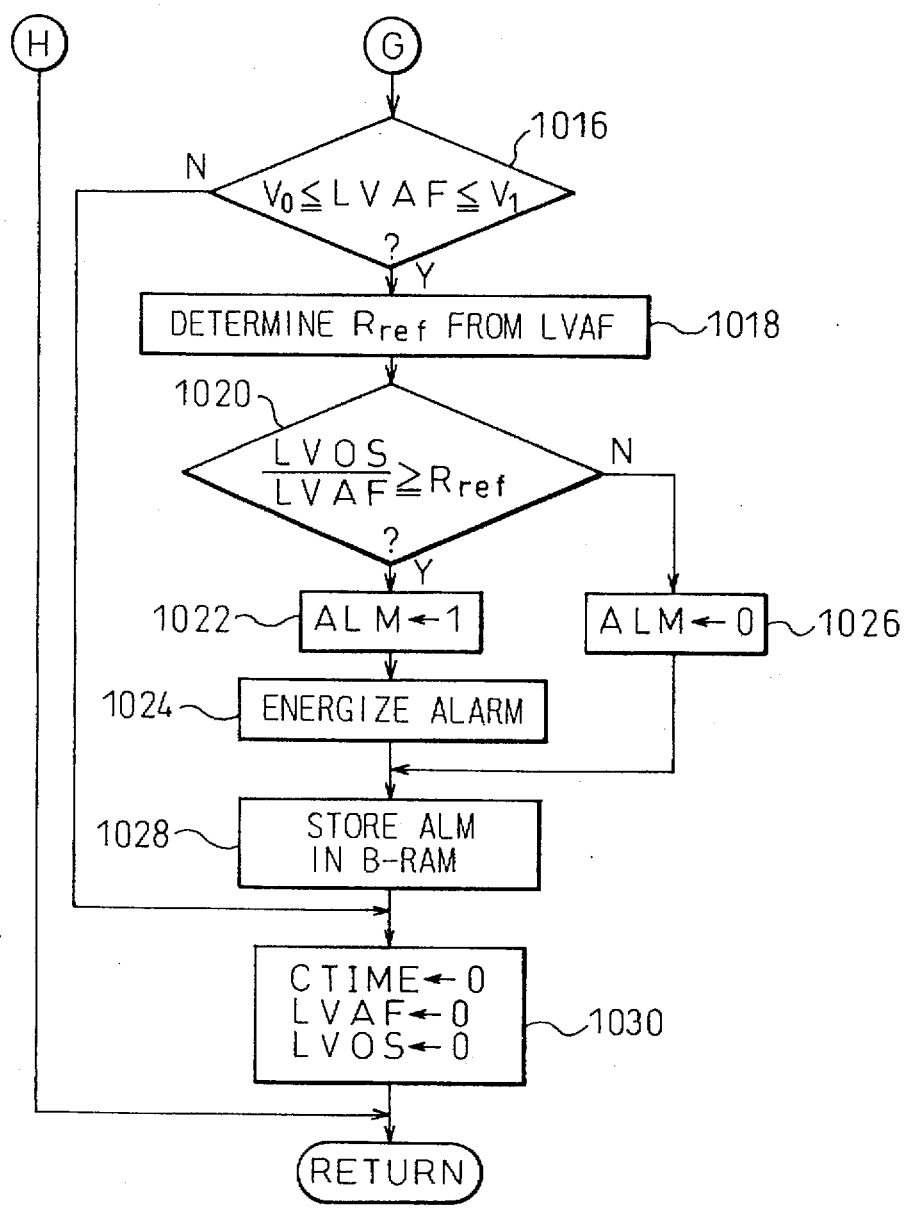

The fifth embodiment will be described next. In the fifth embodiment, determination of the deterioration of the catalyst is made based on the ratio of the response curve length LVOS of the output VOS of the $O_2$ sensor 46 to the response curve length LVAF of the output VAF of the A/F sensor 45, that is, the response curve length ratio LVOS/LVAF, and the catalyst deterioration determination reference value $R_{ref}$ used for that purpose is determined according to the response curve length LVAF of the output of the A/F sensor 45, as shown in FIG. 23. The reference value $R_{ref}$ is converted into a map and stored in advance in the ROM 73. FIGS. 24A and 24B show a flowchart illustrating the catalyst deterioration detection routine according to the fifth embodiment.

The only difference from the flowchart of FIGS. 22A and 22B in the fourth embodiment is that the contents of steps 1018 and 1020 are different from those of the corresponding steps 918 and 920 in the fourth embodiment. More specifically, in step 1018, by referencing the map shown in FIG. 23, the deterioration determination reference value $R_{ref}$ is determined based on the value of LVAF. Then, in step 1020, it is determined whether or not the response curve length ratio LVOS/LVAF is equal to or larger than the deterioration determination reference value $R_{ref}$. If LVOS/LVAF≧$R_{ref}$, it is determined that the catalyst is deteriorated, and if LVOS/LVAF<$R_{ref}$, it is determined that the catalyst is not deteriorated. The remainder of the processing is the same as that in the fourth embodiment.

According to the catalyst deterioration determination process of the fourth or fifth embodiment described above, the determination process is carried out based on the response curve length LVOS of the $O_2$ sensor output or on the response curve length ratio LVOS/LVAF between the $O_2$ sensor and A/F sensor outputs when the response curve length LVAF of the A/F sensor output is within a predetermined range; since the region where the response curve length or the response curve length ratio overlaps the normal and the deteriorated catalyst conditions (see FIGS. 6A and 6B) is excluded in this way, erroneous determination is prevented. Furthermore, since the deterioration determination reference value is changed according to the response curve length LVAF of the A/F sensor output, it becomes possible to compensate for the effects of the limit of the Z characteristic of the $O_2$ sensor (detection becomes impossible in the case of a catalyst exit gas variation larger than a prescribed value). Instead of LVAF, the amplitude of the output variation may be employed, since the amplitude of the output variation is substantially proportional to the response curve length LVAF of the A/F sensor output.

The present invention has been described with reference to the preferred embodiments, but it will be appreciated that the invention is not limited to the illustrated embodiments; rather, it will be easy for those skilled in the art to devise various other embodiments.

In any of the embodiments, since the deterioration of the catalyst is determined accurately on the basis of the output of the $O_2$ sensor mounted downstream of the catalyst, the exhaust gas purification performance improves, and as a result, air pollution is prevented.

What is claimed is:

1. A catalyst deterioration detection device for an internal combustion engine, comprising:

a three-way catalyst mounted in an exhaust passage of said internal combustion engine and having an $O_2$ storage capability;

an air-fuel ratio sensor, mounted upstream of said three-way catalyst, for linearly detecting air-fuel ratio;

air-fuel ratio feedback control means for, based on the output of said air-fuel ratio sensor, calculating a feedback correction amount consisting of a proportional term for bringing the air-fuel ratio to stoichiometry and an integral term for bringing an integrated value of an error between the air-fuel ratio and stoichiometry to zero;

an $O_2$ sensor, mounted downstream of said three-way catalyst, for detecting whether the air-fuel ratio is rich or lean;

catalyst deterioration determining means for determining deterioration of said three-way catalyst on the basis of the length of a response curve that the output of said $O_2$ sensor describes during the time that air-fuel ratio feedback control is being performed by said air-fuel ratio feedback control means; and a response curve length calculation interrupting means for interrupting the calculation of the response curve length being performed by said catalyst deterioration determining means for a predetermined length of time when the output of said air-fuel ratio sensor or the amount of change of said output has exceeded a preset value.

2. A catalyst deterioration detection device for an internal combustion engine, comprising:

a three-way catalyst mounted in an exhaust passage of said internal combustion engine and having an $O_2$ storage capability;

an air-fuel ratio sensor, mounted upstream of said three-way catalyst, for linearly detecting air-fuel ratio;

air-fuel ratio feedback control means for, based on the output of said air-fuel ratio sensor, calculating a feedback correction amount consisting of a proportional term for bringing the air-fuel ratio to stoichiometry and an integral term for bringing an integrated value of an error between the air-fuel ratio and stoichiometry to zero;

an $O_2$ sensor, mounted downstream of said three-way catalyst, for detecting whether the air-fuel ratio is rich or lean;

catalyst deterioration determining means for determining deterioration of said three-way catalyst on the basis of the length of a response curve that the output of said $O_2$ sensor describes during the time that air-fuel ratio feedback control is being performed by said air-fuel ratio feedback control means; and integral term limiting means for imposing an upper limit on an absolute value of said integral term or on a gain of said integral term when processing for determination is being performed by said catalyst deterioration determining means.

3. A catalyst deterioration detection device for an internal combustion engine, comprising:

a three-way catalyst mounted in an exhaust passage of said internal combustion engine and having an $O_2$ storage capability;

an air-fuel ratio sensor, mounted upstream of said three-way catalyst, for linearly detecting air-fuel ratio;

first air-fuel ratio feedback control means for, based on the output of said air-fuel ratio sensor, calculating a feedback correction amount consisting of a proportional term for bringing the air-fuel ratio to stoichiometry and an integral term for bringing an integrated value of an error between the air-fuel ratio and stoichiometry to zero;

an $O_2$ sensor, mounted downstream of said three-way catalyst, for detecting whether the air-fuel ratio is rich or lean;

second air-fuel ratio feedback control means for correcting the output of said air-fuel ratio sensor on the basis of the output of said $O_2$ sensor;

catalyst deterioration determining means for determining deterioration of said three-way catalyst on the basis of the length of a response curve that the output of said $O_2$ sensor describes during the time that air-fuel ratio feedback control is being performed by said first air-fuel ratio feedback control means; and air-fuel ratio sensor output correction inhibiting means for inhibiting the correction of the output of said air-fuel ratio sensor by said second air-fuel ratio feedback control means when processing for determination is being performed by said catalyst deterioration determining means.

4. A catalyst deterioration detection device for an internal combustion engine, comprising:

a three-way catalyst mounted in an exhaust passage of said internal combustion engine and having an $O_2$ storage capability;

an air-fuel ratio sensor, mounted upstream of said three-way catalyst, for linearly detecting an air-fuel ratio;

air-fuel ratio feedback control means for feedback controlling the air-fuel ratio toward stoichiometry on the basis of the output of said air-fuel ratio sensor;

an $O_2$ sensor, mounted downstream of said three-way catalyst, for detecting whether the air-fuel ratio is rich or lean;

catalyst deterioration determining means for determining deterioration of said three-way catalyst by comparing the length of a response curve that the output of said $O_2$ sensor describes or the ratio of the response curve length of the output of said $O_2$ sensor to that of the output of said air-fuel ratio sensor with a deterioration determination reference value during the time that air-fuel ratio feedback control is being performed by said air-fuel ratio feedback control means; and catalyst deterioration determination limiting means for imposing a limit so that the determination by said catalyst deterioration determining means is carried out only when the response curve length or variation amplitude of the output of said air-fuel ratio sensor is within a prescribed range.

5. A catalyst deterioration detection device for an internal combustion engine, comprising:

a three-way catalyst mounted in an exhaust passage of said internal combustion engine and having an $O_2$ storage capability;

an air-fuel ratio sensor, mounted upstream of said three-way catalyst, for linearly detecting an air-fuel ratio;

air-fuel ratio feedback control means for feedback controlling the air-fuel ratio toward stoichiometry on the basis of the output of said air-fuel ratio sensor;

an $O_2$ sensor, mounted downstream of said three-way catalyst, for detecting whether the air-fuel ratio is rich or lean;

catalyst deterioration determining means for determining deterioration of said three-way catalyst by comparing the length of a response curve that the output of said $O_2$ sensor describes or the ratio of the response curve length of the output of said $O_2$ sensor to that of the output of said air-fuel ratio sensor with a deterioration determination reference value during the time that air-fuel ratio feedback control is being performed by said air-fuel ratio feedback control means; and reference value changing means for changing said deterioration determination reference value according to the response curve length or variation amplitude of the output of said air-fuel ratio sensor.

* * * * *